US011928522B2

(12) United States Patent
Xia

(10) Patent No.: US 11,928,522 B2
(45) Date of Patent: Mar. 12, 2024

(54) CONTAINERIZED VNF DEPLOYMENT METHOD AND RELATED DEVICE

(71) Applicant: HUAWEI TECHNOLOGIES CO., LTD., Guangdong (CN)

(72) Inventor: Haitao Xia, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 147 days.

(21) Appl. No.: 17/527,121

(22) Filed: Nov. 15, 2021

(65) Prior Publication Data

US 2022/0075666 A1 Mar. 10, 2022

Related U.S. Application Data

(63) Continuation of application No. PCT/CN2020/090915, filed on May 18, 2020.

(30) Foreign Application Priority Data

May 16, 2019 (CN) .......................... 201910407713.2

(51) Int. Cl.
*H04L 29/08* (2006.01)
*G06F 8/61* (2018.01)
(Continued)

(52) U.S. Cl.
CPC ........ *G06F 9/5077* (2013.01); *G06F 9/45558* (2013.01); *H04L 67/51* (2022.05);
(Continued)

(58) Field of Classification Search
CPC ............... G06F 9/5077; G06F 9/45558; G06F 2009/4557; G06F 2009/45595; G06F 2009/45562; H04L 67/51
(Continued)

(56) References Cited

U.S. PATENT DOCUMENTS 10,469,317 B1 * 11/2019 Jiang ..................... H04L 41/082
2018/0123943 A1 * 5/2018 Lee ..................... H04L 12/4641
(Continued)

FOREIGN PATENT DOCUMENTS

| CN | 106533935 A | 3/2017 |
|---|---|---|
| CN | 107547237 A | 1/2018 |

(Continued)

OTHER PUBLICATIONS

ETSI GR NFV-IFA 029 v0.16.0 (May 2019), Network Functions Virtualization (NFV); Architecture; Report on the Enhancements of the NFV architecture towards "cloud-native" and "PaaS" Release 3, total 91 pages.*

(Continued)

*Primary Examiner* — Emmanuel L Moise
*Assistant Examiner* — Berhanu Shitayewoldetadik
(74) *Attorney, Agent, or Firm* — HUAWEI TECHNOLOGIES CO., LTD.

(57) ABSTRACT

A containerized virtualised network function (VNF) deployment method and a related device are disclosed. The disclosed method, implemented by a VNF manager (VNFM), includes receiving a first VNF instantiation request from a network functions virtualisation orchestrator (NFVO), where the first VNF instantiation request carries a first VNF instance identifier and a first virtualised network function descriptor (VNFD) identifier. The method further includes determining a container object package identifier referenced by a VNFD identified by the first VNFD identifier, sending a container object package management request to a container management entity, and receiving a container object package management response, which indicates that a container object instance in a container object package is successfully created, from the container management entity. Furthermore, the method includes creating a VNF instance (Continued)

identified by the first VNF instance identifier, and maintaining a mapping relationship between the first VNF instance identifier and the container object package identifier.

20 Claims, 12 Drawing Sheets

(51) Int. Cl.
| | | |
|---|---|---|
| G06F 8/65 | (2018.01) | |
| G06F 9/455 | (2018.01) | |
| G06F 9/50 | (2006.01) | |
| G06F 15/16 | (2006.01) | |
| H04L 12/24 | (2006.01) | |
| H04L 15/16 | (2006.01) | |
| H04L 29/06 | (2006.01) | |
| H04L 41/08 | (2022.01) | |
| H04L 41/082 | (2022.01) | |
| H04L 67/10 | (2022.01) | |
| H04L 67/51 | (2022.01) | |

(52) U.S. Cl.
CPC .............. *G06F 2009/4557* (2013.01); *G06F 2009/45595* (2013.01)

(58) Field of Classification Search
USPC ........................................................ 709/226
See application file for complete search history.

(56) References Cited

U.S. PATENT DOCUMENTS

| | | | |
|---|---|---|---|
| 2018/0191607 A1 | 7/2018 | Kanakarajan | |
| 2019/0052549 A1* | 2/2019 | Duggal | G06Q 30/0635 |
| 2019/0273668 A1* | 9/2019 | Xia | H04L 41/14 |
| 2019/0334781 A1* | 10/2019 | Caldwell | H04L 41/12 |
| 2019/0349258 A1* | 11/2019 | Xia | H04L 41/0893 |
| 2020/0044919 A1* | 2/2020 | Yao | H04L 41/0806 |
| 2020/0313981 A1* | 10/2020 | Chatras | G06F 9/455 |
| 2020/0322232 A1* | 10/2020 | Xia | H04L 41/5041 |
| 2020/0329119 A1* | 10/2020 | Xia | H04L 61/50 |
| 2020/0364073 A1* | 11/2020 | Obara | H04L 12/46 |
| 2021/0117241 A1* | 4/2021 | Xia | G06F 9/45558 |
| 2021/0389970 A1* | 12/2021 | Geng | H04L 41/0895 |
| 2022/0182851 A1* | 6/2022 | Xia | H04W 48/18 |
| 2022/0225170 A1* | 7/2022 | Xia | H04L 41/0895 |
| 2022/0294708 A1* | 9/2022 | Xia | H04L 41/40 |

FOREIGN PATENT DOCUMENTS

| | | |
|---|---|---|
| CN | 108011846 A | 5/2018 |
| CN | 108345490 A | 7/2018 |
| CN | 109347716 A | 2/2019 |
| CN | 109639460 A | 4/2019 |
| EP | 3471345 A1 | 4/2019 |
| WO | 2018174897 A1 | 9/2018 |

OTHER PUBLICATIONS

ETSI GR NFV-IFA 029 v0.16.0 (May 2019), Network Functions Virtualisation (NFV); Architecture; Report on the Enhancements of the NFV architecture towards "Cloud-native" and "PaaS" Release 3, total 91 pages.

ETSI GS NFV-IFA 011 V3.2.1 (Apr. 2019), Network Functions Virtualisation (NFV) Release 3;Management and Orchestration; VNF Descriptor and Packaging Specification, Total 79 Pages.

ETSI GS NFV-IFA 007 V3.2.1 (Apr. 2019), Network Functions Virtualisation (NFV) Release 3;Management and Orchestration; Or-Vnfm reference point—Interface and Information Model Specification, Total 192 Pages.

ETSI GS NFV-IFA 010 V3.2.1 (Apr. 2019), Network Functions Virtualisation (NFV) Release 3;Management and Orchestration; Functional requirements specification, Total 101 Pages.

"Network Functions Virtualisation (NFV); Management and Orchestration", ETSI GS NFV-MAN 001 V1.1.1(Dec. 2014), Total 184 Pages.

* cited by examiner

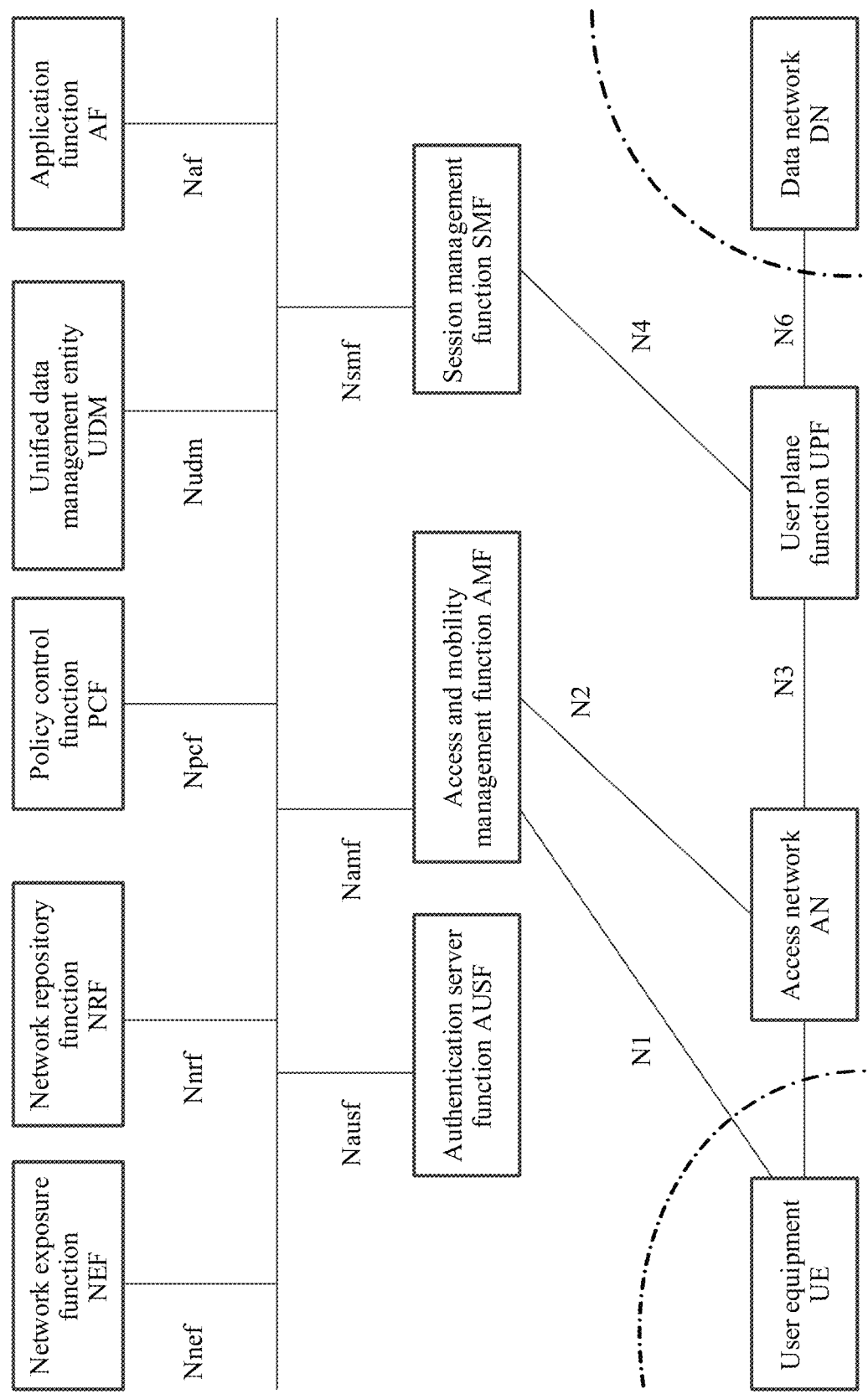
FIG. 1-A

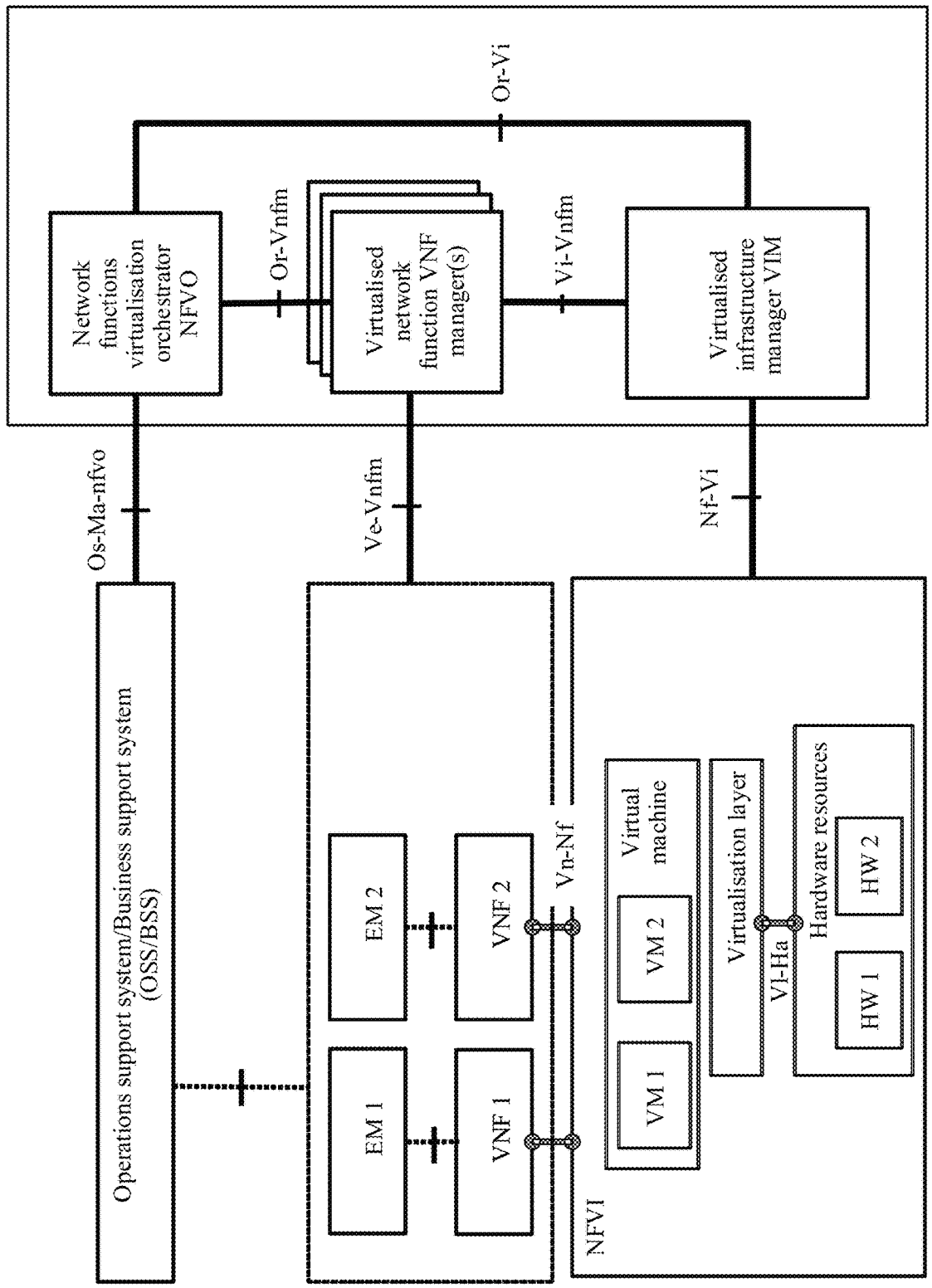
FIG. 1-B

CONTAINERIZED VNF DEPLOYMENT METHOD AND RELATED DEVICE

CROSS-REFERENCE TO RELATED APPLICATIONS

This application is a continuation of International Application No. PCT/CN2020/090915, filed on May 18, 2020. The International Application claims priority to Chinese Application No. 201910407713.2, filed on May 16, 2019. The disclosures of the aforementioned applications are hereby incorporated by reference in their entireties.

TECHNICAL FIELD

This application relates to the field of communications technologies, and in particular, to a containerized VNF deployment method and a related device.

BACKGROUND

Network functions virtualisation (NFV, Network Function Virtualisation) is a technology in which telecommunications network operators use virtualisation technologies in the field of information technologies (IT, Information Technologies) to implement decoupling between software and hardware for some telecommunications network functions (for example, core network functions) of general-purpose servers, switches, and storages, so as to implement fast and efficient deployment and operation of network services (NSs, Network Services), and reduce network investment costs and operating costs as well. Telecommunications network functions are implemented as software and can be run on general-purpose server hardware by applying the NFV technology. The telecommunications network functions can be migrated, instantiated, and deployed in different physical positions of a network as required, without needing to install new devices.

For example, a container as a service (CaaS, Container as a Service) may be considered as a specific type of platform as a service (PaaS, Platform as a Service). Generally, a container (Container) is an operating system—level virtualisation technology, and isolates different processes by using operating system isolation technologies such as CGroup and NameSpace in Linux. Different from a hardware virtualisation (Hypervisor) technology, in the container technology, there is no virtual hardware, and there is no operating system but only processes in the container. By virtue of this major feature of the container technology, containers are more lightweight and easier to manage in comparison with virtual machines. In a running state of a container, a group of common management operations are defined, such as starting, stopping, pausing, and deleting the container, to manage a lifecycle of the container in a unified manner.

Because application forms supported by a containerized VNF are service-oriented or microservice-oriented, it is generally complex to implement a containerized VNF deployment mechanism.

SUMMARY

Embodiments of this application provide a containerized VNF deployment method and a related device, to reduce complexity of containerized VNF deployment.

A first aspect of the embodiments of this application provides a containerized VNF deployment method. The method includes the following steps.

A network functions virtualisation orchestrator (NFVO) sends a first VNF instantiation request to a virtualised network function manager (VNFM, VNF Manager). The virtualised network function manager (VNFM) receives the first VNF instantiation request from the network functions virtualisation orchestrator (NFVO). The first VNF instantiation request carries a first VNF instance identifier and a first virtualised network function descriptor (VNFD, VNF Descriptor) identifier. The VNFM determines a container object package identifier referenced by a VNFD identified by the first VNFD identifier (a container object package is, for example, a managed container infrastructure object package (MCIOP)).

The VNFM sends a container object package management request to a container management entity (the container management entity is, for example, a container infrastructure service management entity CISM), where the container object package management request carries the container object package identifier. The VNFM receives a container object package management response from the container management entity, where the container object package management response is used to indicate that a container object instance (a container object is, for example, a managed container infrastructure object (MCIO)) in the container object package identified by the container object package identifier is successfully created. The container object package management response may carry, for example, a container object instance identifier of the successfully created container object instance.

The VNFM creates a VNF instance identified by the first VNF instance identifier, and maintains (for example, locally maintains) a mapping relationship between the first VNF instance identifier and the container object package identifier.

The container object package management request may be used to, for example, trigger the container management entity to create, based on the container object package identifier, the container object instance in the container object package identified by the container object package identifier. That the container management entity creates, based on the container object package identifier, the container object instance in the container object package identified by the container object package identifier may include, for example, determining a container object package file referenced by the container object package identified by the container object package identifier, creating the container object instance (for example, a container infrastructure object) in the container object package based on the container object package file, and scheduling the created container object instance to a container runtime instance (the container runtime instance is, for example, a container infrastructure service (CIS) instance) used by the container object instance.

The container object package includes one or more container objects, and each container object may be, for example, mapped as an object in an open-source de facto standard.

The container object may be, for example, mapped as a Kubernetes object, and the Kubernetes object includes, for example, a pod, a service, or a deployment.

In some possible implementations, the container object package file may be, for example, mapped as a Helm Chart, and the container object package instance may be, for example, mapped as a Helm Release.

In some possible implementations, for example, the container object is visible to the container management entity and invisible to a management and orchestration entity.

It can be learned that, in the containerized VNF deployment solution provided in the embodiments of this application, a VNFD can be enabled to refer the container object package identifier by enhancing a VNFD model, so that the VNFD supports containerized VNF deployment. The VNFM initiates, to the container management entity based on a reference relationship between the VNFD and the container object package, a management operation corresponding to the container object package. In addition, a management operation oriented to the container object and infrastructure resources (VMs or bare metals) does not need to be processed at an interface between the VNFM and the container management entity. The VNFD supports containerized VNF deployment, so that a VM-based VNF on a live network can evolve to a containerized VNF more smoothly. This reduces complexity of containerized VNF deployment.

In some possible implementations, before the VNFM sends the container object package management request to the container management entity, the method further includes: The VNFM sends a container object package creation request to the container management entity, where the container object package creation request carries a name and/or an access address of the container object package file used for creating the container object package. The VNFM receives a container object package creation response from the container management entity, where the container object package creation response carries the container object package identifier of the container object package created by the container management entity. The container object package creation request may be, for example, used to trigger the container management entity, after the container management entity receives the container object package creation request, to obtain the container object package file based on the name and/or the access address of the container object package file, use the container object package file to create the container object package, and send a container object package creation response to the VNFM, where the container object package creation response carries the container object package identifier of the container object package created by the container management entity.

When some VNF instances need to be terminated, the VNF instances may be terminated by executing the following example procedure. In some possible implementations, the VNFM may receive a VNF instance termination request from the NFVO, where the VNF instance termination request carries a second VNF instance identifier; the VNFM determines a container object package identifier that has a mapping relationship with the second VNF instance identifier; and the VNFM sends a container object package deletion request to the container management entity, where the container object package deletion request carries the determined container object package identifier. The container object package deletion request may be, for example, used to trigger the container management entity to terminate the container object instance in the container object package identified by the container object package identifier, and release the container runtime instance used by the terminated container object instance.

In some possible implementations, an infrastructure resource pool may be further created in the following manner. For example, the method further includes: The VNFM receives a second VNF instantiation request from the NFVO, where the second VNF instantiation request carries the second VNF instance identifier (the second VNF instance identifier is a VNF instance identifier of a to-be-terminated VNF instance) and a second VNFD identifier. The VNFM obtains, from a VNFD identified by the second VNFD identifier, a quantity of VM resources and a specification of VM resources that are required by the to-be-created infrastructure resource pool. The VNFM sends a resource allocation request to a virtualised infrastructure manager VIM, where the resource allocation request carries the specification of VM resources and the quantity of VM resources that are of the to-be-created infrastructure resource pool. The VNFM receives a resource allocation response from the VIM, where the resource allocation response carries a VM instance identifier of an allocated VM instance. The VNFM adds a label to the VM instance, where the label is used to indicate that the VM instance is used as a virtual resource for creating a container runtime instance in the infrastructure resource pool. The VNFM sends the VM instance identifier to the container management entity for management (that is, the container management entity is commissioned to manage the VM resources).

In some possible implementations, the VNFD may further include a virtualisation deployment unit (VDU) identifier. When the VNF is a VM-based VNF, a VDU attribute included in the VNFD is allowed to be used, and a container object package attribute referenced by the VNFD is forbidden to be used. When the VNF is a containerized VNF, a VDU attribute included in the VNFD is allowed to be used or forbidden to be used, and a container object package attribute referenced by the VNFD is allowed to be used.

A resource allocation process can be better controlled by constraining the foregoing attribute use in the foregoing example, so that processing complexity is reduced.

A second aspect of the embodiments of this application provides a virtualised network function manager VNFM. The VNFM includes:

a receiving unit, configured to receive a first virtualised network function VNF instantiation request from an NFVO, where the first VNF instantiation request carries a first VNF instance identifier and a first virtualised network function descriptor VNFD identifier;

a determining unit, configured to determine a container object package identifier referenced by a VNFD identified by the first VNFD identifier;

a sending unit, configured to send a container object package management request to a container management entity, where the container object package management request carries the container object package identifier, where the receiving unit is further configured to receive a container object package management response from the container management entity, where the container object package management response is used to indicate that a container object instance in a container object package identified by the container object package identifier is successfully created; and a creation management unit, configured to create a VNF instance identified by the first VNF instance identifier, and locally maintain a mapping relationship between the first VNF instance identifier and the container object package identifier.

For example, the container object package management request may be used to trigger the container management entity to create the container object instance in the container object package based on a container object package file after determining the container object package file referenced by the container object package identified by the container object package identifier, and schedule the created container object instance to a container runtime instance used by the container object instance.

In some possible implementations, the sending unit may be further configured to: before sending the container object package management request to the container management entity, send a container object package creation request to the container management entity, where the container object package creation request carries a name and/or an access address of the container object package file used for creating the container object package.

The receiving unit is further configured to receive a container object package creation response from the container management entity, where the container object package creation response carries the container object package identifier of the container object package created by the container management entity.

In some possible implementations, the receiving unit is further configured to receive a VNF instance termination request from the NFVO, where the VNF instance termination request carries a second VNF instance identifier.

The determining unit may be further configured to determine a container object package identifier that has a mapping relationship with the second VNF instance identifier.

The sending unit is further configured to send a container object package deletion request to the container management entity, where the container object package deletion request carries the determined container object package identifier. The container object package deletion request is used to trigger the container management entity to terminate the container object instance in the container object package identified by the container object package identifier, and release the container runtime instance used by the terminated container object instance.

In some possible implementations, the receiving unit is further configured to receive a second VNF instantiation request from the NFVO, where the second VNF instantiation request carries the second VNF instance identifier and a second VNFD identifier.

The VNFM further includes an obtaining unit, configured to obtain, from a VNFD identified by the second VNFD identifier, a quantity of VM resources and a specification of VM resources that are required by a to-be-created infrastructure resource pool.

The sending unit is further configured to send a resource allocation request to a virtualised infrastructure manager VIM, where the resource allocation request carries the specification of VM resources and the quantity of VM resources that are of the to-be-created infrastructure resource pool.

The receiving unit is further configured to receive a resource allocation response from the VIM, where the resource allocation response carries a VM instance identifier of an allocated VM instance.

The VNFM further includes a labeling unit, configured to add a label to the VM instance, where the label is used to indicate that the VM instance is used as a virtual resource for creating a container runtime instance in the infrastructure resource pool.

The sending unit is further configured to send the VM instance identifier to the container management entity for management.

In some possible implementations, the container object package file is mapped as a Helm Chart, and the container object package instance is mapped as a Helm Release.

In some possible implementations, the VNFD further includes a virtualisation deployment unit VDU identifier.

When the VNF is a VM-based VNF, a VDU attribute included in the VNFD is allowed to be used, and a container object package attribute referenced by the VNFD is forbidden to be used. When the VNF is a containerized VNF, a VDU attribute included in the VNFD is allowed to be used or forbidden to be used, and a container object package attribute referenced by the VNFD is allowed to be used.

In some possible implementations, the container object package includes one or more container objects, and each container object is, for example, mapped as an object in an open-source de facto standard.

In some possible implementations, the container object is mapped as a Kubernetes object, and the Kubernetes object includes a pod, a service, or a deployment.

In some possible implementations, the container object is, for example, visible to the container management entity and invisible to a management and orchestration entity.

A third aspect of the embodiments of this application further provides a resource pool creation method. The method includes: A virtualised network function manager VNFM receives a second virtualised network function VNF instantiation request from a network functions virtualisation orchestrator NFVO, where the second VNF instantiation request carries a second VNF instance identifier and a second virtualised network function descriptor VNFD identifier.

The VNFM obtains, from a VNFD identified by the second VNFD identifier, a quantity of VM resources and a specification of VM resources that are required by a to-be-created infrastructure resource pool.

The VNFM sends a resource allocation request to a virtualised infrastructure manager VIM, where the resource allocation request carries the specification of VM resources and the quantity of VM resources that are of the to-be-created infrastructure resource pool.

The VNFM receives a resource allocation response from the VIM, where the resource allocation response carries a VM instance identifier of an allocated VM instance. The VNFM adds a label to the VM instance, where the label is used to indicate that the VM instance is used as a virtual resource for creating a container runtime instance in the infrastructure resource pool. The VNFM sends the VM instance identifier to a container management entity for management.

It can be learned that, to reduce complexity of managing the infrastructure resource pool deployed for a containerized VNF, and improve efficiency and reliability of managing the infrastructure resource pool, a capability of an NFV MANO system for managing VM resources is reused and extended in the foregoing example solution, to create the infrastructure resource pool required for deploying the containerized VNF. Specifically, the VM resource pool required for deploying the containerized VNF may be considered as a special VNF, and the infrastructure resource pool deployed for the containerized VNF is created by executing a VNF instantiation process. After the infrastructure resource pool is successfully created, the VNF instantiation process may be further executed.

A fourth aspect of the embodiments of this application further provides a virtualised network function manager VNFM. The VNFM includes:

a receiving unit, configured to receive a second virtualised network function VNF instantiation request from an NFVO, where the second VNF instantiation request carries a second VNF instance identifier and a second virtualised network function descriptor VNFD identifier;

an obtaining unit, configured to obtain, from a VNFD identified by the second VNFD identifier, a quantity of VM resources and a specification of VM resources that are required by a to-be-created infrastructure resource pool;

a sending unit, configured to send a resource allocation request to a virtualised infrastructure manager VIM, where the resource allocation request carries the specification of VM resources and the quantity of VM resources that are of the to-be-created infrastructure resource pool, where the receiving unit is further configured to receive a resource allocation response from the VIM, where the resource allocation response carries a VM instance identifier of an allocated VM instance; and a labeling unit, configured to add a label to the VM instance, where the label is used to indicate that the VM instance is used as a virtual resource for creating a container runtime instance in the infrastructure resource pool, where the sending unit is further configured to send the VM instance identifier to a container management entity for management.

A fifth aspect of the embodiments of this application further provides a containerized VNF deployment method. The method includes:

a VNFM receives a first virtualised network function VNF instantiation request from an NFVO, where the first VNF instantiation request carries a first VNF instance identifier and a first VNFD identifier;

the VNFM determines a container object package identifier referenced by a VNFD identified by the first VNFD identifier;

the VNFM sends a container object package management request to a container management entity, where the container object package management request carries the container object package identifier;

after receiving the container object package management request, the container management entity creates, based on the container object package identifier, a container object instance in a container object package identified by the container object package identifier; the container management entity sends a container object package management response to the VNFM, where the container object package management response is used to indicate that the container object instance in the container object package is successfully created; and the VNFM receives the container object package management response from the container management entity, creates a VNF instance identified by the first VNF instance identifier, and maintains (for example, locally maintains) a mapping relationship between the first VNF instance identifier and the container object package identifier.

The creating, based on the container object package identifier, a container object instance in a container object package identified by the container object package identifier may include, for example, determining a container object package file referenced by the container object package identified by the container object package identifier, creating the container object instance in the container object package based on the container object package file, and scheduling the created container object instance to a container runtime instance used by the container object instance.

In some possible implementations, before the VNFM sends the container object package management request to the container management entity, the method further includes: The VNFM sends a container object package creation request to the container management entity, where the container object package creation request carries a name and/or an access address of the container object package file used for creating the container object package; and after receiving the container object package creation request, the container management entity obtains the container object package file based on the name and/or the access address of the container object package file, uses the container object package file to create the container object package, and sends a container object package creation response to the VNFM, where the container object package creation response carries the container object package identifier of the container object package created by the container management entity.

In some possible implementations, the method may further include: The VNFM receives a VNF instance termination request from the NFVO, where the VNF instance termination request carries a second VNF instance identifier; the VNFM determines a container object package identifier that has a mapping relationship with the second VNF instance identifier; and the VNFM sends a container object package deletion request to the container management entity, where the container object package deletion request carries the determined container object package identifier.

After receiving the container object package deletion request, the container management entity terminates a container object instance in the container object package identified by the container object package identifier, and releases a container runtime instance used by the terminated container object instance.

A sixth aspect of the embodiments of this application further provides a communications system, including a VNFM and a container management entity.

The VNFM is configured to: receive a first virtualised network function VNF instantiation request from an NFVO, where the first VNF instantiation request carries a first VNF instance identifier and a first VNFD identifier; determine a container object package identifier referenced by a VNFD identified by the first VNFD identifier; and send a container object package management request to the container management entity, where the container object package management request carries the container object package identifier.

The container management entity is configured to: after receiving the container object package management request, create, based on the container object package identifier, a container object instance in a container object package identified by the container object package identifier; send a container object package management response to the VNFM, where the container object package management response is used to indicate that the container object instance in the container object package is successfully created.

The VNFM is further configured to: receive the container object package management response from the container management entity, create a VNF instance identified by the first VNF instance identifier, and maintain (for example, locally maintains) a mapping relationship between the first VNF instance identifier and the container object package identifier.

The creating, based on the container object package identifier, a container object instance in a container object package identified by the container object package identifier may include, for example, determining a container object package file referenced by the container object package identified by the container object package identifier, creating the container object instance in the container object package based on the container object package file, and scheduling the created container object instance to a container runtime instance used by the container object instance.

In some possible implementations, the VNFM is further configured to: before sending the container object package management request to the container management entity, send a container object package creation request to the container management entity, where the container object package creation request carries a name and/or an access address of the container object package file used for creating the container object package.

The container management entity is further configured to: after receiving the container object package creation request, obtain the container object package file based on the name and/or the access address of the container object package file, use the container object package file to create the container object package, and send a container object package creation response to the VNFM, where the container object package creation response carries the container object package identifier of the container object package created by the container management entity.

In some possible implementations, the VNFM is further configured to: receive a VNF instance termination request from the NFVO, where the VNF instance termination request carries a second VNF instance identifier; determine a container object package identifier that has a mapping relationship with the second VNF instance identifier; and send a container object package deletion request to the container management entity, where the container object package deletion request carries the determined container object package identifier.

The container management entity is further configured to: after receiving the container object package deletion request, terminate the container object instance in the container object package identified by the container object package identifier, and release a container runtime instance used by the terminated container object instance.

A seventh aspect of the embodiments of this application provides a containerized VNF deployment method. The method includes: A container management entity receives a container object package management request from a virtualised network function manager VNFM, where the container object package management request carries a container object package identifier referenced by a virtualised network function descriptor VNFD;
  the container management entity creates, based on the container object package identifier, a container object instance in a container object package identified by the container object package identifier; and
  the container management entity sends a container object package management response to the VNFM, where the container object package management response is used to indicate that the container object instance in the container object package identified by the container object package identifier is successfully created.

For example, the creating, based on the container object package identifier, a container object instance in a container object package identified by the container object package identifier may include: determining a container object package file referenced by the container object package identified by the container object package identifier, creating the container object instance in the container object package based on the container object package file, and scheduling the created container object instance to a container runtime instance used by the container object instance.

An eighth aspect of the embodiments of this application provides a container management entity, including:

a receiving unit, configured to receive a container object package management request from a virtualised network function manager VNFM, where the container object package management request carries a container object package identifier referenced by a virtualised network function descriptor VNFD;
  a creation unit, configured to create, based on the container object package identifier, a container object instance in a container object package identified by the container object package identifier; and
  a sending unit, configured to send a container object package management response to the VNFM, where the container object package management response is used to indicate that the container object instance in the container object package identified by the container object package identifier is successfully created.

For example, the creating, based on the container object package identifier, a container object instance in a container object package identified by the container object package identifier may include: determining a container object package file referenced by the container object package identified by the container object package identifier, creating the container object instance in the container object package based on the container object package file, and scheduling the created container object instance to a container runtime instance used by the container object instance.

A ninth aspect of the embodiments of this application provides a virtualised network function manager VNFM, including a processor and a memory that are coupled to each other. The processor is configured to invoke a computer program stored in the memory, to complete some or all of steps of any method performed by the VNFM in the embodiments of this application.

A tenth aspect of the embodiments of this application provides a container management entity, including a processor and a memory that are coupled to each other. The processor is configured to invoke a computer program stored in the memory, to complete some or all of steps of any method performed by the container management entity in the embodiments of this application.

An eleventh aspect of the embodiments of this application provides a computer-readable storage medium. The computer-readable storage medium stores a computer program, and the computer program is executed by a processor to complete some or all of steps of any method performed by a VNFM in the embodiments of this application.

A twelfth aspect of the embodiments of this application provides a computer-readable storage medium. The computer-readable storage medium stores a computer program, and the computer program is executed by a processor to complete some or all of steps of any method performed by a container management entity in the embodiments of this application.

BRIEF DESCRIPTION OF DRAWINGS

The following describes some accompanying drawings in embodiments of this application.

FIG. 1-A is a schematic architectural diagram of a communications system according to an embodiment of this application;

FIG. 1-B is a schematic diagram of an ETSI NFV MANO standard architecture according to an embodiment of this application;

DESCRIPTION OF EMBODIMENTS

Figure 2:
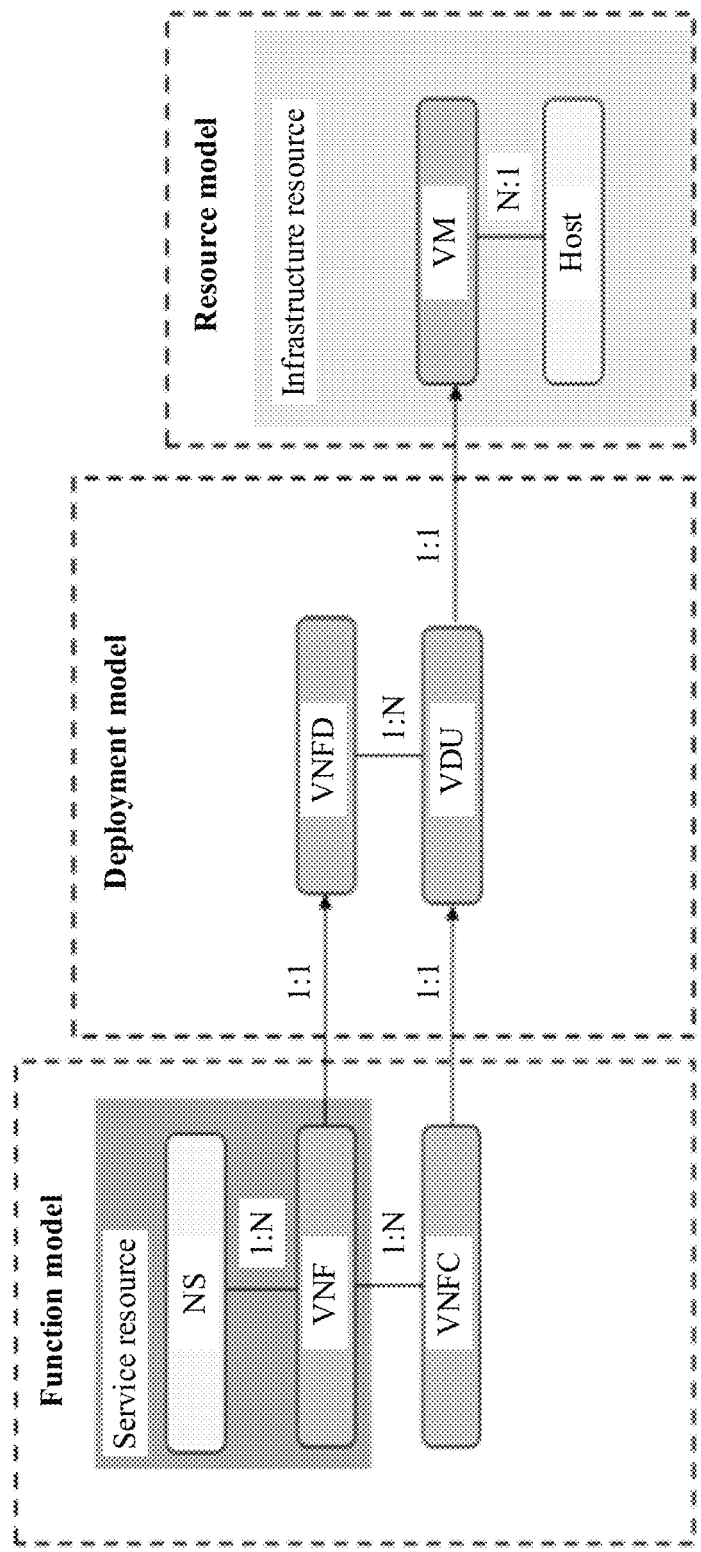
FIG. 2 is a schematic diagram of a VM-based VNF information model according to an embodiment of this application.

The following describes solutions of embodiments of this application with reference to the accompanying drawings in the embodiments of this application.

NFV standardization efforts mainly focus on virtualised network functions (VNFs, Virtualised Network Functions) and dynamic management and orchestration (MANO, management and orchestration) of network services and virtual resources. Generally, the interface and architecture (IFA, Interface and Architecture) working group of the NFV industry specification group under the European telecommunications standards institute (ETSI, European Telecommunications Standards Institute) is dedicated to function formulation of the MANO framework and the like. A function architecture of the MANO framework may be shown in FIG. 1-B.

In the architecture shown in FIG. 1-B, an NFV orchestrator (NFVO, NFV Orchestrator) may be configured to implement the following functions: managing and processing network service descriptors (NSDs, NS Descriptors) and virtualised network function forwarding graphs (VNFFGs, VNF Forwarding Graphs), managing network service lifecycles, working with a VNFM to implement VNF lifecycle management, and providing a global view of virtual resources.

The VNF manager (VNFM, VNF Manager) may execute virtualised network function VNF lifecycle management, including virtualised network function descriptor (VNFD, VNF Descriptor) management, VNF instantiation, VNF instance auto scaling (including scaling out/up and scaling in/down), VNF instance healing (healing), and VNF instance termination. The VNFM further supports receiving of an auto scaling (scaling) policy delivered by the NFVO, to implement VNF auto scaling.

A virtualised infrastructure manager (VIM, Virtualised Infrastructure Manager) is mainly responsible for managing (including reserving and allocating) virtualised resources (including virtual computing, storage, and network resources) at an infrastructure layer, virtualised resource status monitoring, fault reporting, and provisioning of a virtualised resource pool for upper-layer applications.

An operations support system/business support system (OSS/BSS, Operations Support System/Business Support System) may be an existing operation and maintenance system OSS/BSS of operators.

An element manager (EM, Element Manager) performs conventional fault (Fault), configuration (Configuration), account (Account), performance (Performance), and security (Security) management (FCAPS management for short) functions for VNFs.

A virtualised network function (VNF, Virtualised Network Function) corresponds to a physical network function (PNF) in a conventional non-virtualised network, for example, a virtualised EPC node (a packet gateway, a serving gateway, or the like). Functional behavior and statuses of a network function are unrelated to virtualisation of the network function. The NFV technology requires that the VNF and the PNF have same functional behavior and a same external interface.

NFV infrastructure (NFVI, NFV Infrastructure) is an infrastructure layer of NFV functions, and includes hardware resources, virtual resources, and a virtualisation layer. From a perspective of VNFs, the virtualisation layer and the hardware resources are considered as an entity that can provide required virtual resources.

A function model, a deployment model, and a resource model of a VNF is mainly described with regard to a managed object information model in the NFV field. Details may be shown in FIG. 2.

In the function model (also referred to as a function view), highest-level managed objects in the NFV field are network services (NSs), and each NS may include one or more VNFs. Further, each VNF may include one or more VNF components (VNFCs, VNF Components) of a lower function level. NSs are visible only to the NFVO, VNFs are visible to both the NFVO and the VNFM, and VNFCs are visible only to the VNFM.

In the deployment model (also referred to as a deployment view), VNFs of a same type (for example, vMMEs or vPGWs) uniquely correspond to a VNF descriptor (VNFD) file, and one or more VNF instances are created by using the VNFD. A VNFD may include one or more finer-granularity virtualisation deployment units (VDUs, Virtualisation Deployment Units), and each VDU uniquely corresponds to a type of VNFCs, and includes description information required for deployment and running of this type of VNFCs.

In the resource model (also referred to as a resource view), the virtualisation layer of the NFVI abstracts and encapsulates underlying hardware resources (or referred to as physical resources) into virtual machines (VMs, Virtual Machines). A VNF may be deployed on a plurality of VMs, and each VM uniquely bears functions of one VNFC. Certainly, a VNF may alternatively be deployed on one VM. In a VNFD, each VDU describes a requirement of a type of VNFCs for infrastructure virtual resources (Infrastructure Resources), and a VM allocated by the VIM encapsulates information about the infrastructure virtual resources that satisfy the requirement. From the function model, the deployment model, to the resource model, there is a one-to-one mapping relationship between a VNFC, a VDU, and a VM. A host (host) is a hardware resource, and one or more VM instances may be created on one host through division. VMs are visible to both the NFVO and the VNFM, but host resources are invisible to the NFVO and the VNFM.

Introduction of a CaaS architecture to a telecommunications network function cloudification process brings agile transformation to development and operation and maintenance (DevOps) in the telecommunications industry. Accordingly, conventional large-granularity monolithic network functions are gradually decomposed into services or even microservices. Each service-oriented function is independently developed, delivered, and maintained, and therefore version upgrade becomes more frequent. In addition, sharp increase of containerized network functions does not exponentially increase workload of interoperability testing, and a stable API definition ensures consistency and reliability of interface function invocation.

Figure 3:
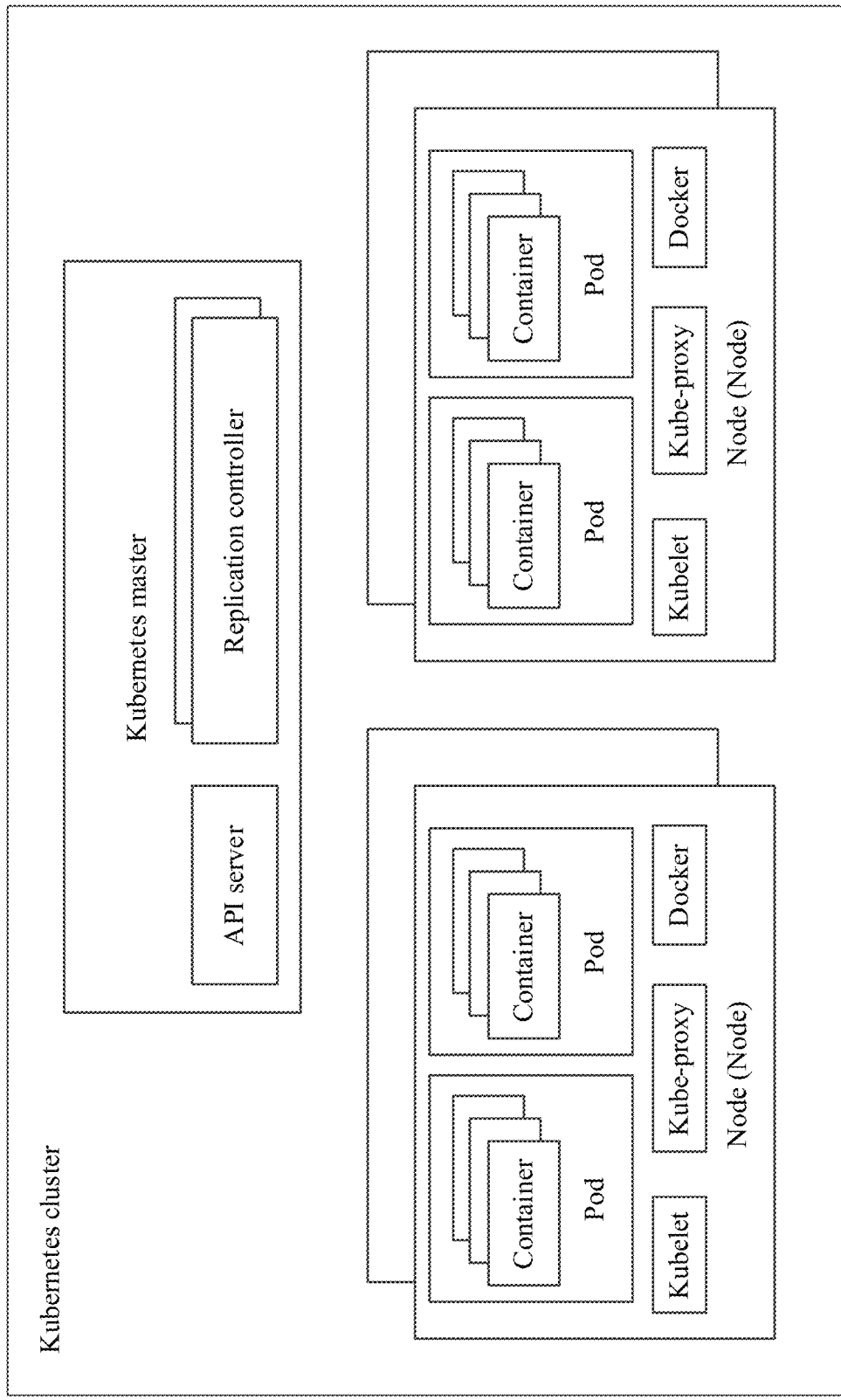
FIG. 3 is a schematic diagram of a Kubernetes container management and orchestration architecture according to an embodiment of this application.

Currently, the most popular application in the container management and orchestration field is Kubernetes (K8s for short) container cluster management technology developed by Google Inc. based on an open-source platform. Kubernetes holds the core idea that everything is service-centered and service-focused, and containerized application systems created on Kubernetes can independently run on physical machines, virtual machines, or enterprise private clouds, and can also be hosted on public clouds. Kubernetes also features automation. A service can be self-scaled, self-diagnosed, and be upgraded easily. An example of Kubernetes container management and orchestration is shown in FIG. 3.

Container management and orchestration is an important enhanced feature of a base architecture in the evolution from telecommunications network functions virtualisation (NFV) to cloud native (CloudNative). An NFV MANO system is connected to a mature container management platform (such as Kubernetes) in the industry to form a standard interoperability scenario, to ensure continuous DevOps delivery of containerized VNFs by using architecture functions. Enhancements of the NFV managed object information model to which containers are introduced have not been specifically described in a conventional technology.

Figure 4:
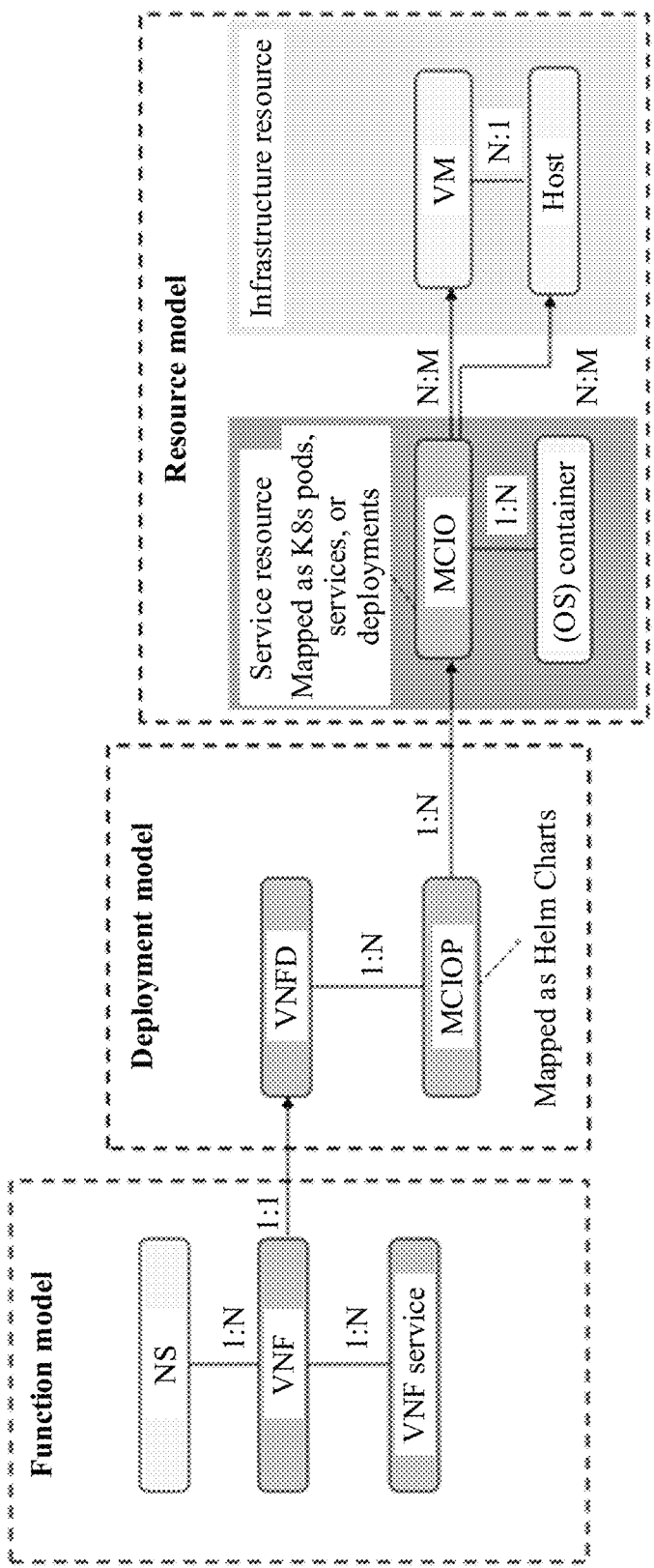
FIG. 4 is a schematic diagram of an information model of a containerized VNF according to an embodiment of this application.

A containerized VNF information model provided in the embodiments of this application may be shown in FIG. 4. In a resource model of a containerized VNF, an abstract logical resource layer (for example, server resources in the resource model shown in FIG. 4) constituted by container objects (for example, Kubernetes objects such as pods, services, or deployments) is introduced. The logical resource layer isolates infrastructure resources (for example, VM resources) from container-based VNFs. The NFV MANO system manages the container objects at the logical resource layer without managing infrastructure resources, which are managed by the NFVI.

Because containerized VNFs are visible only to container objects at the abstract logical resource layer, containerized NFVs do not focus on specific infrastructure resources on which VNF functions are deployed. Therefore, containerized VNF deployment differs greatly from conventional VM-based VNF deployment. In addition, when information models of containerized VNFs and VM-based VNFs are incompatible with each other, and VNFs of a same type (such as vMMEs) evolve from VM-based VNFs to containerized VNFs, two independent VNFD models are required to support a VNF instantiation process. This undoubtedly increases VNF deployment complexity.

In the solutions of the embodiments of this application, some containerized VNF deployment methods are provided, so that both VM-based VNF deployment and containerized VNF deployment can be supported by a unified VNFD. This facilitates smooth evolution from VM-based VNFs to containerized VNFs on a live network, and reduces complexity of containerized VNF deployment.

Compared with the VM-based VNF information model shown in FIG. 2, in the resource model of the VNF, the abstract logical resource layer, that is, service resources (service resources), constituted by container objects, is encapsulated on infrastructure resources.

Specifically, as shown in FIG. 4, the service resources include abstract container objects, which are referred to as managed container infrastructure objects (MCIOs, Managed Container Infrastructure Objects). These abstract container objects may be specifically mapped as container objects in an open-source container de facto standard, and may be specifically, for example, pods, services, deployments, ReplicaSets, and Stateful Sets in Kubernetes. The MCIOs or similar objects may also be collectively referred to as container objects. In other words, the container object may be termed as an MCIO, or may have another name.

Generally, how an MCIO is mapped as a container object in the open-source container de facto standard is not limited in this application. At a service resource layer, the MCIO further includes one or more OS containers. There is a many-to-many mapping relationship between MCIOs and virtual machines (VMs) or bare metals (hosts) in infrastructure resources. Each MCIO may be deployed on one or more VMs or bare metals, and one or more MCIOs may be deployed on one VM or one bare metal.

VNFCs are no longer used in the function model of the containerized VNF; instead, VNF services are used. In other words, containerized VNF functions are service-oriented or microservice-oriented.

In addition, the concept of VDUs is no longer forcibly used in the deployment model of the containerized VNF. Instead, managed container infrastructure object packages (MCIOPs, Managed Container Infrastructure Object Packages) are used. An MCIOP includes one or more MCIOs in the resource model. The MCIOP includes descriptor files and configuration files of these MCIOs, and these files are placed in a containerized VNF package (VNF Package) file. There is no explicit mapping relationship between a VNF service and an MCIOP. Generally, in a VNFD, an index (for example, a pointer) is used to point to one or more MCIOPs placed in a VNF package. The MCIOP is an abstract container object package concept, and may be specifically mapped as a container object in the open-source container de facto standard, for example, a Helm Chart. MCIOPs or similar objects may also be collectively referred to as container object packages. In other words, the container object package may be termed as an MCIOP, and certainly, the container object package may alternatively have another name.

Figure 5:
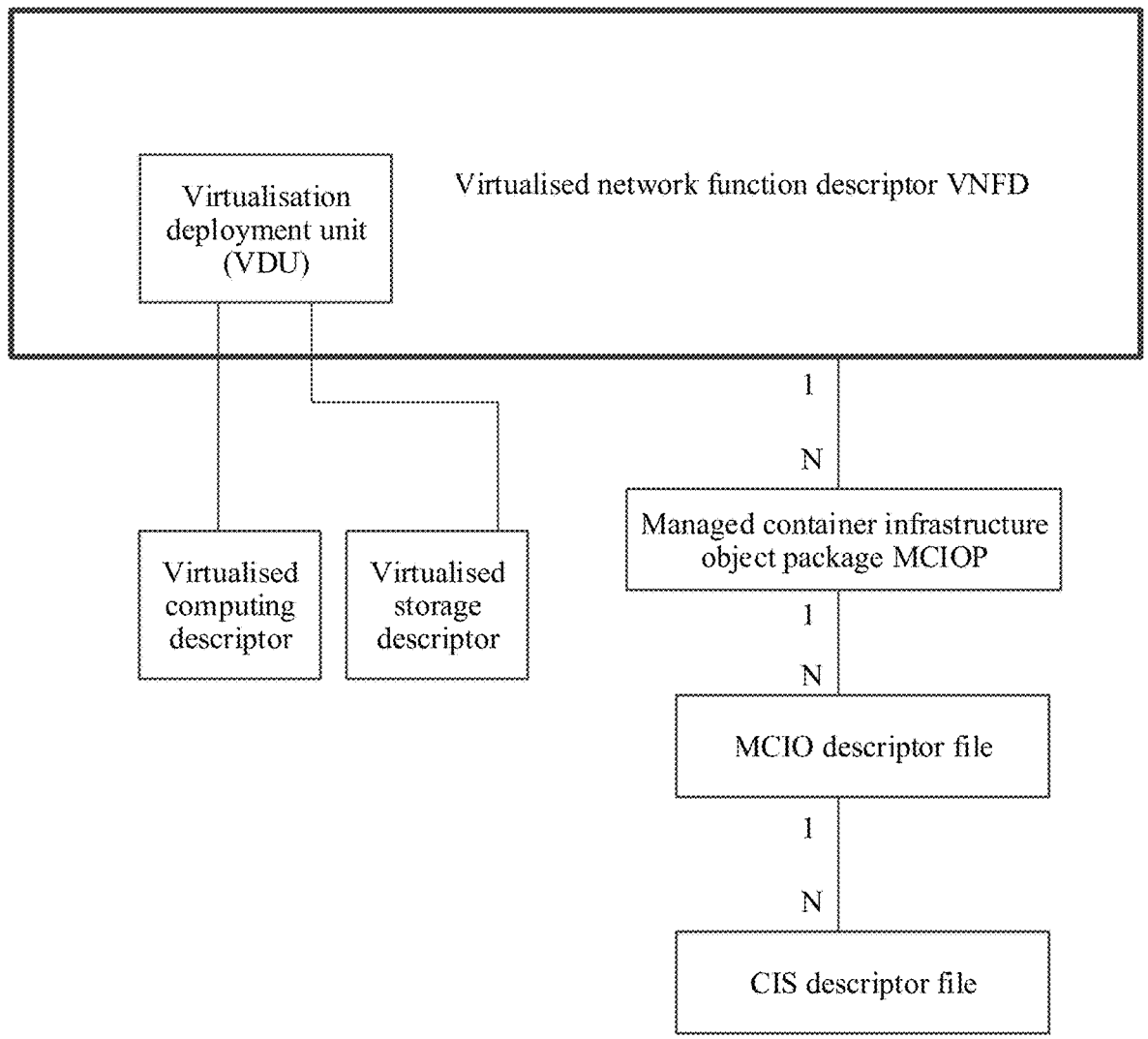
FIG. 5 is a schematic diagram of an enhanced containerized VNFD according to an embodiment of this application.

An example of an enhanced form of a containerized VNF descriptor (VNFD, VNF Descriptor) file may be shown in FIG. 5. Left branches of a VDU in FIG. 5 remain unchanged, and are defined based on the existing ETSI NFV standard (ETSI GS NFV-IFA 011). A right branch is newly introduced in FIG. 5, to support containerized VNF deployment. A definition of an MCIOP is beyond a VNFD, and the VNFD may point to definitions of one or more MCIOP by using an index. The MCIOP further points to a descriptor file or a configuration file of one or more MCIOs in the MCIOP by using an index. The descriptor file or the configuration file of the MCIO further points to, by using an index, a description file of container infrastructure services (CISs, Container Infrastructure Services) required when each MCIO runs. The container infrastructure service may also be understood as a container runtime environment (CRE, Container Runtime Environment). Requirements for computing/storage/network resources required for container running are encapsulated in the environment, and may be mapped as node objects in open-source Kubernetes. CISs or similar objects may be collectively referred to as container runtime instances.

The following describes some network architectures in which network functions virtualisation may exist.

FIG. 1-A is a schematic diagram of an example of a 5G network architecture according to an embodiment of this application. In a 5G network, some function network elements (for example, a mobility management entity (MME, Mobility Management Entity)) in a 4G network are split, and a service-based architecture is defined. In the network architecture shown in FIG. 1-A, a function similar to that of an MME in the 4G network is split into an access and mobility management function (AMF, Access and Mobility Management Function), a session management function (SMF, Session Management Function), and the like.

The following describes some other related network elements/entities.

User equipment (UE, User Equipment) accesses a data network (DN, Data Network) and the like by accessing an operator network, and uses services provided by an operator or a third party in the DN.

An access and mobility management function (AMF) is a control-plane network element in a 3GPP network, and is mainly responsible for access control and mobility management when the UE accesses an operator network. A security anchor function (SEAF, Security Anchor Function) may be deployed on the AMF, or deployed on a device other than the AMF. FIG. 1-A is an example in which the SEAF is deployed on the AMF. When the SEAF is deployed on the AMF, the SEAF and the AMF may be collectively referred to as an AMF.

A session management function (SMF) is a control-plane network element in the 3GPP network. The SMF is mainly responsible for managing packet data unit (PDU, Packet Data Unit) sessions of the UE. A PDU session is a channel used to transmit a PDU, and the UE and the DN may send a PDU to each other by using a PDU session. The SMF is responsible for management tasks such as establishment, maintenance, and deletion of a PDU session.

The data network (DN, Data Network), also referred to as a packet data network (PDN, Packet Data Network), is a network located outside the 3GPP network. A plurality of DNs may be connected to the 3GPP network, and a plurality of services provided by operators or third parties may be deployed in the DNs. For example, a DN is a private network of a smart factory, a sensor installed in a workshop of the smart factory plays a role of UE, and a control server of the sensor is deployed in the DN. The UE communicates with the control server. After obtaining an instruction of the control server, the UE may transfer collected data to the control server according to the instruction. For another example, a DN is an internal office network of a company, a terminal used by an employee of the company may play a role of UE, and the UE may access internal information and other resources of the company.

A unified data management network element (UDM, Unified Data Management) is also a control-plane network element in the 3GPP network. The UDM is mainly responsible for storing subscription data, credentials (credentials), permanent identifiers (SUPIs, Subscriber Permanent Identifiers), and the like of subscribers (UEs) in the 3GPP network. The data may be used for authentication and authorization when the UE accesses the operator 3GPP network.

An authentication server function (AUSF, Authentication Server Function) is also a control-plane network element in the 3GPP network. The AUSF is mainly used for first-level authentication (that is, subscriber authentication in the 3GPP network).

A network exposure function (NEF, Network Exposure Function) is also a control-plane network element in a 3GPP network. The NEF is mainly responsible for exhibiting external interfaces of the 3GPP network to third parties in a secure manner. When a network element such as the SMF needs to communicate with a third-party network element, the NEF may serve as a relay for communication. The NEF can translate internal and external identifiers when serving as the relay. For example, when an SUPI of the UE is sent from the 3GPP network to a third party, the NEF may translate the SUPI into an external identity (ID, Identity) corresponding to the SUPI. In addition, when an external identity ID is sent to the 3GPP network, the NEF may translate the external identity ID into a corresponding SUPI.

A network repository function (NRF, Network Repository Function) is also a control-plane network element in a 3GPP network. The NRF is mainly responsible for storing configuration and service profiles (profiles) of accessible network functions (NFs), and providing network function discovery services for other network elements.

A user plane function (UPF, User Plane Function) is a gateway for communication between the 3GPP network and the DN.

A policy control function (PCF, Policy Control Function) is a control-plane function in the 3GPP network, and is configured to provide a policy of a PDU session for the SMF. The policy may be related to charging, quality of service (QoS, Quality of Service), authorization, and the like.

An access network (AN, Access Network) is a sub-network of the 3GPP network. To access the 3GPP network, the UE needs to first access the AN. In a radio access scenario, the AN is also referred to as a radio access network (RAN, Radio Access Network). Therefore, terms "RAN" and "AN" are usually used interchangeably.

The 3GPP network is a network that complies with a 3GPP standard. In FIG. 1-A, parts other than the UE and the DN may be considered as the 3GPP network. The 3GPP network is not only limited to a 5G network defined by the 3GPP, and may further include a 2G network, a 3G network, and a 4G network. Usually, the 3GPP network is operated by an operator. In addition, N1, N2, N3, N4, N6, and the like in the architecture shown in FIG. 1-A represent reference points (Reference Points) between related network elements/network functions. Nausf, Namf, and the like represent service-oriented interfaces of related network functions. Certainly, the 3GPP network and a non-3GPP network may coexist, and some network elements in the 5G network may also be used in some non-5G networks.

For example, some or all core network functions in the 5G architecture shown in FIG. 1-A may be virtualised. Some or all core network functions in a 3G, 4G, or another network architecture may also be virtualised, and examples are not provided herein.

Based on the foregoing example architecture and concepts, the following provides related procedures of containerized VNF deployment methods and containerized VNF instance termination methods.

Figure 6:
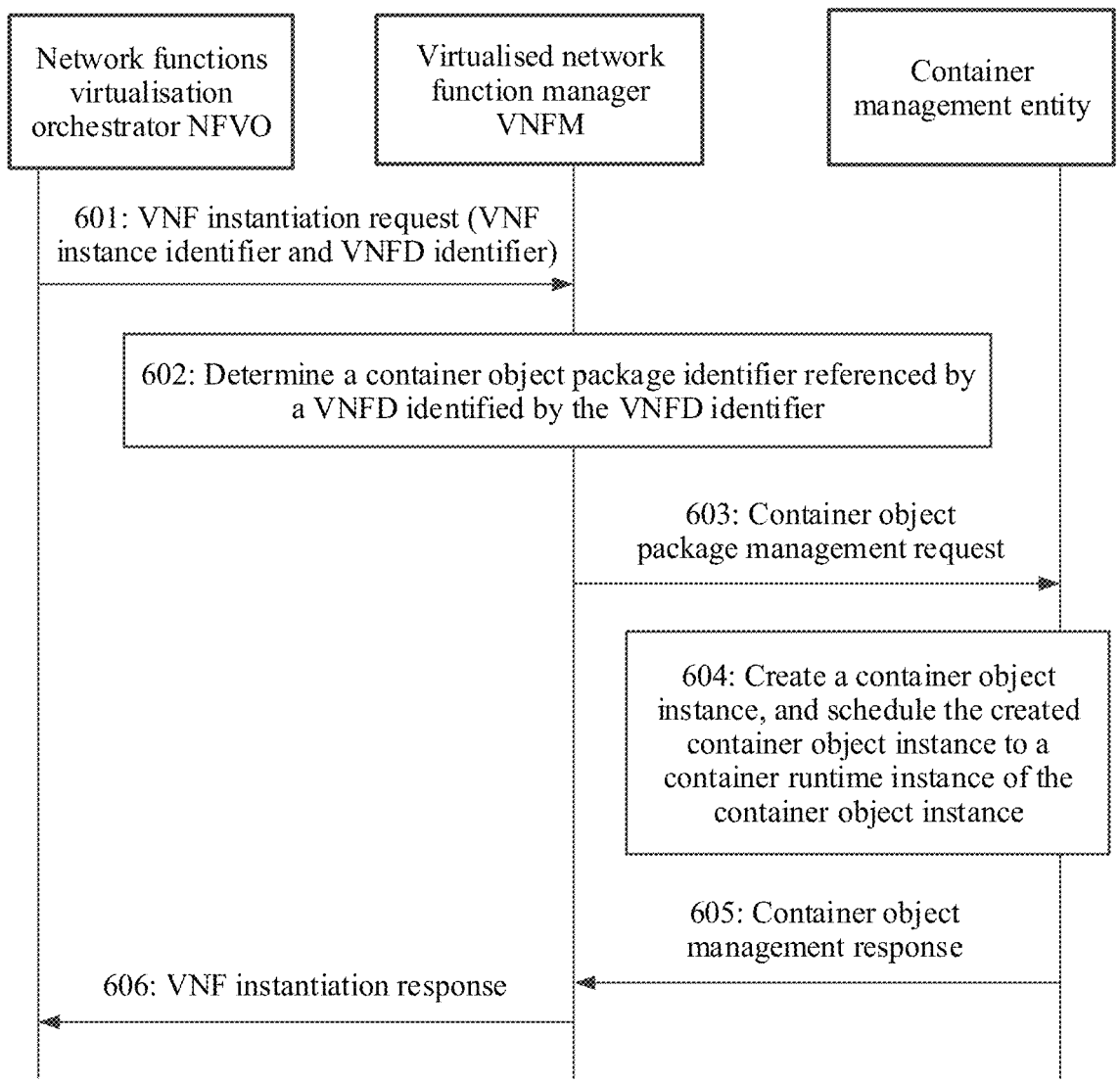
FIG. 6 is a schematic flowchart of a containerized VNF deployment method according to an embodiment of this application.

FIG. 6 is a schematic flowchart of a containerized VNF deployment method according to an embodiment of this application. The containerized VNF deployment method may include the following steps.

601: An NFVO sends a first VNF instantiation request to a VNFM, where the first VNF instantiation request carries a first VNF instance identifier and a first VNFD identifier.

A first VNF instance identified by the first VNF instance identifier is a to-be-instantiated VNF instance.

602: The VNFM receives the first virtualised network function VNF instantiation request from the NFVO, and determines a container object package identifier referenced by a VNFD identified by the first VNFD identifier.

603: The VNFM sends a container object package management request to a container management entity, where the container object package management request carries the container object package identifier.

The container management entity in this embodiment of this application may be, for example, a container infrastructure service manager (CISM, Container Infrastructure Service Management) in the ETSI NFV standard.

604: The container management entity receives the container object package management request from the VNFM, and creates, based on the container object package identifier, a container object instance in a container object package identified by the container object package identifier.

The creating, based on the container object package identifier, a container object instance in a container object package identified by the container object package identifier may include, for example, determining a container object package file referenced by the container object package identified by the container object package identifier, creating the container object instance in the container object package based on the container object package file, and scheduling the created container object instance to a container runtime instance used by the container object instance.

605: The container management entity sends a container object package management response to the VNFM, where the container object package management response is used to indicate that the container object instance in the container object package identified by the container object package identifier is successfully created.

606: The VNFM receives the container object package management response from the container management entity, creates a VNF instance identified by the first VNF instance identifier, and maintains (for example, locally maintains or non-locally maintains) a mapping relationship between the first VNF instance identifier and the container object package identifier.

607: The VNFM sends, to the NFVO, a first VNF instantiation response in response to the first VNF instantiation request.

Requirements of a container object for an infrastructure resource (for example, a VM) may be described in a descriptor file corresponding to the container object in the container object package. When the container management entity creates a container object, a scheduler in the container management entity may schedule the container object to a container runtime instance (for example, a Kubernetes node) with an infrastructure resource capability.

It can be learned that, in the containerized VNF deployment solution, a VNFD model can be enabled to refer the container object package identifier by enhancing the VNFD model, so that a VNFD supports containerized VNF deployment. The VNFM initiates, to the container management entity based on a reference relationship between the VNFD and the container object package, a management operation corresponding to the container object package, and may do not need to process, at an interface between the VNFM and the container management entity, a management operation oriented to the container object and infrastructure resources (VMs or bare metals). The VNFD supports containerized VNF deployment, so that a VM-based VNF on a live network can evolve to a containerized VNF more smoothly. This reduces complexity of containerized VNF deployment.

In some possible implementations, the container object package file may be mapped as a Helm Chart, and a container object package instance may be mapped as a Helm Release.

In some possible implementations, the VNFD may further include a virtualisation deployment unit (VDU) identifier. When the VNF is a VM-based VNF, a VDU attribute included in the VNFD is allowed to be used, and a container object package attribute referenced by the VNFD is forbidden to be used. When the VNF is a containerized VNF, a VDU attribute included in the VNFD is allowed to be used or forbidden to be used, and a container object package attribute referenced by the VNFD is allowed to be used.

In some possible implementations, the container object package may include one or more container objects, and each container object is mapped as, for example, an object in an open-source de facto standard.

For example, the container object may be mapped as a Kubernetes object, and the Kubernetes object includes a pod, a service, or a deployment.

For example, the container object is visible to the container management entity and invisible to a management and orchestration entity.

Further, before the VNFM sends the container object package management request to the container management entity, the method further includes: The VNFM sends a container object package creation request to the container management entity, where the container object package creation request carries a name and/or an access address of the container object package file used for creating the container object package. After receiving the container object package creation request, the container management entity obtains the container object package file based on the name and/or the access address of the container object package file, uses the container object package file to create the container object package, and sends a container object package creation response to the VNFM, where the container object package creation response carries the container object package identifier of the container object package created by the container management entity. The VNFM receives the container object package creation response from the container management entity.

Further, the VNFM may terminate the VNF instance. Specifically, for example, the VNFM receives a VNF instance termination request from the NFVO, where the VNF instance termination request carries a second VNF instance identifier. The VNFM determines a container object package identifier that has a mapping relationship with the second VNF instance identifier. The VNFM sends a container object package deletion request to the container management entity, where the container object package deletion request carries the determined container object package identifier. The container object package deletion request is used to trigger the container management entity to terminate a container object instance in the container object package identified by the container object package identifier, and release a container runtime instance used by the terminated container object instance.

Further, the VNFM may further create an infrastructure resource pool, and the infrastructure resource pool may provide virtual resources for creating a container runtime instance.

Specifically, for example, the VNFM receives a second VNF instantiation request from the NFVO, where the second VNF instantiation request carries the second VNF instance identifier and a second VNFD identifier; the VNFM obtains, from a VNFD identified by the second VNFD identifier, a quantity of VM resources and a specification of VM resources that are required by the to-be-created infrastructure resource pool; the VNFM sends a resource allocation request to a virtualised infrastructure manager VIM, where the resource allocation request carries the specification of VM resources and the quantity of VM resources that are of the to-be-created infrastructure resource pool; the VNFM receives a resource allocation response from the VIM, where the resource allocation response carries a VM instance identifier of an allocated VM instance; the VNFM adds a label to the VM instance, where the label is used to indicate that the VM instance is used as a virtual resource for creating a container runtime instance in the infrastructure resource pool; and the VNFM sends the VM instance identifier to the container management entity for management.

Figure 7:
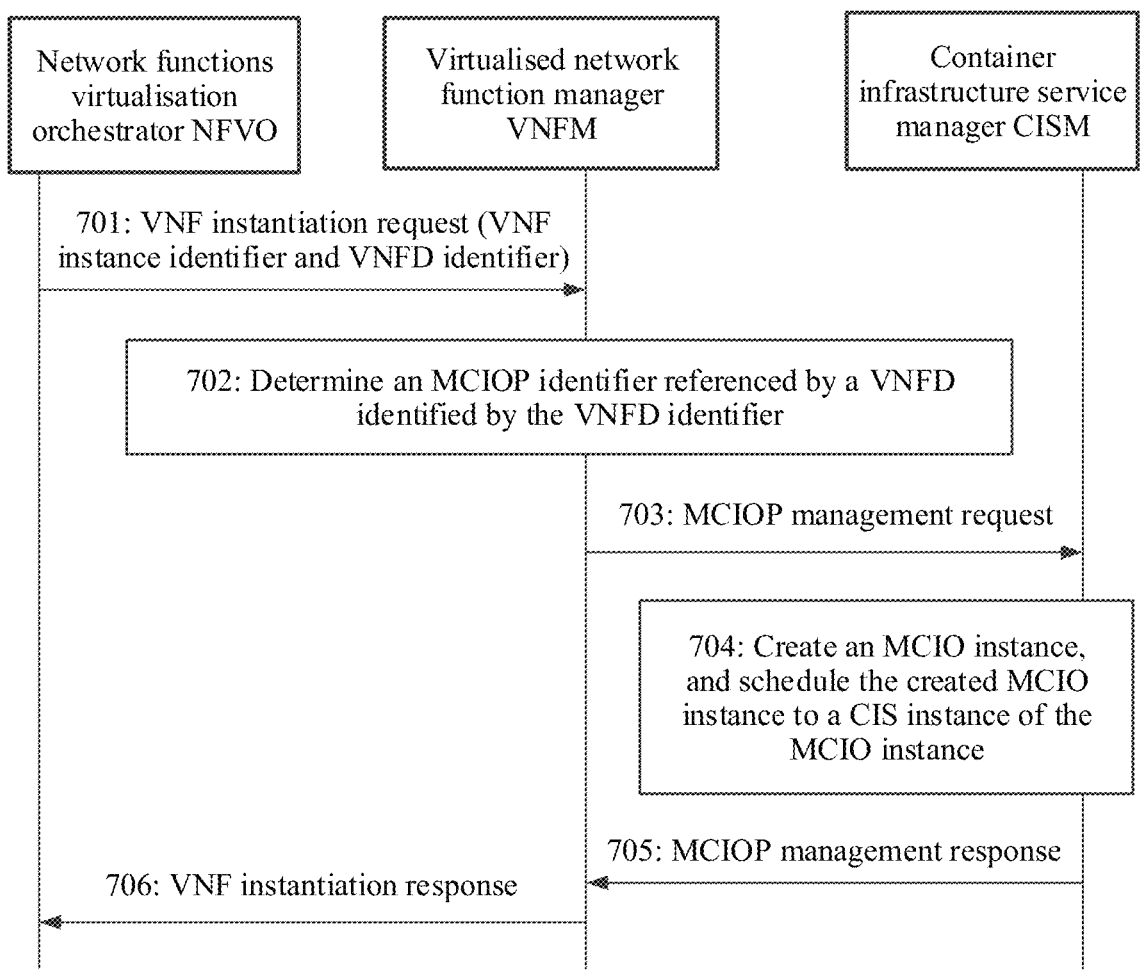
FIG. 7 is a schematic flowchart of a containerized VNF instantiation method according to an embodiment of this application.

FIG. 7 is a schematic flowchart of a containerized VNF instantiation method according to an embodiment of this application. The method may include the following steps.

701: An NFVO sends a VNF instantiation request to a VNFM, where the VNF instantiation request carries a VNF identifier and a VNFD identifier.

702: The VNFM receives the VNF instantiation request from the NFVO, and parses the VNF instantiation request to obtain the VNF identifier and the VNFD identifier carried in the VNF instantiation request. The VNFM determines an MCIOP identifier referenced by a VNFD identified by the VNFD identifier.

703: The VNFM sends an MCIOP management request to a CISM, where the MCIOP management request carries the determined MCIOP identifier.

Before this step, MCIOP files (for example, an MCIO descriptor file and an MCIO configuration file) indexed by an MCIOP may be all included in a VNF package file, a process of loading the VNF package file has been completed, and the VNF package file is available in a corresponding catalog (Catalog) library.

704: The CISM receives the MCIOP management request from the VNFM.

The CISM may access an MCIOP identified by the MCIOP identifier, determine the MCIOP files (for example, the MCIO descriptor file and the MCIO configuration file) indexed by the accessed MCIOP, use the MCIOP files to create an MCIO instance in the MCIOP, and schedule the created MCIO instance to a CIS instance of the MCIO instance.

705: The CISM sends, to the VNFM, an MCIOP management response in response to the MCIOP management request, where the management response is used to indicate that the MCIO instance in the MCIOP is successfully created.

706: The VNFM receives, from the CISM, the MCIOP management response in response to the MCIOP management request, creates a VNF instance identified by a VNF instance identifier, and locally maintains a mapping relationship between the VNF instance identifier and the MCIOP identifier. The VNFM sends, to the NFVO, a VNF instantiation response in response to the VNF instantiation request. The VNF instantiation response may be used to notify that the VNF instantiation process ends.

It can be learned that, in the containerized VNF instantiation solution, a VNFD model can be enabled to refer the container object package identifier by enhancing the VNFD model, so that a VNFD supports containerized VNF deployment. The VNFM initiates, to the CISM based on a reference relationship between the VNFD and the MCIOP, a management operation corresponding to the MCIOP, and may do not need to process, at an interface between the VNFM and the CISM, a management operation oriented to the MCIO and infrastructure resources (VMs or bare metals). The VNFD supports containerized VNF deployment, so that a VM-based VNF on a live network can evolve to a containerized VNF more smoothly. This reduces complexity of containerized VNF deployment.

Figure 8:
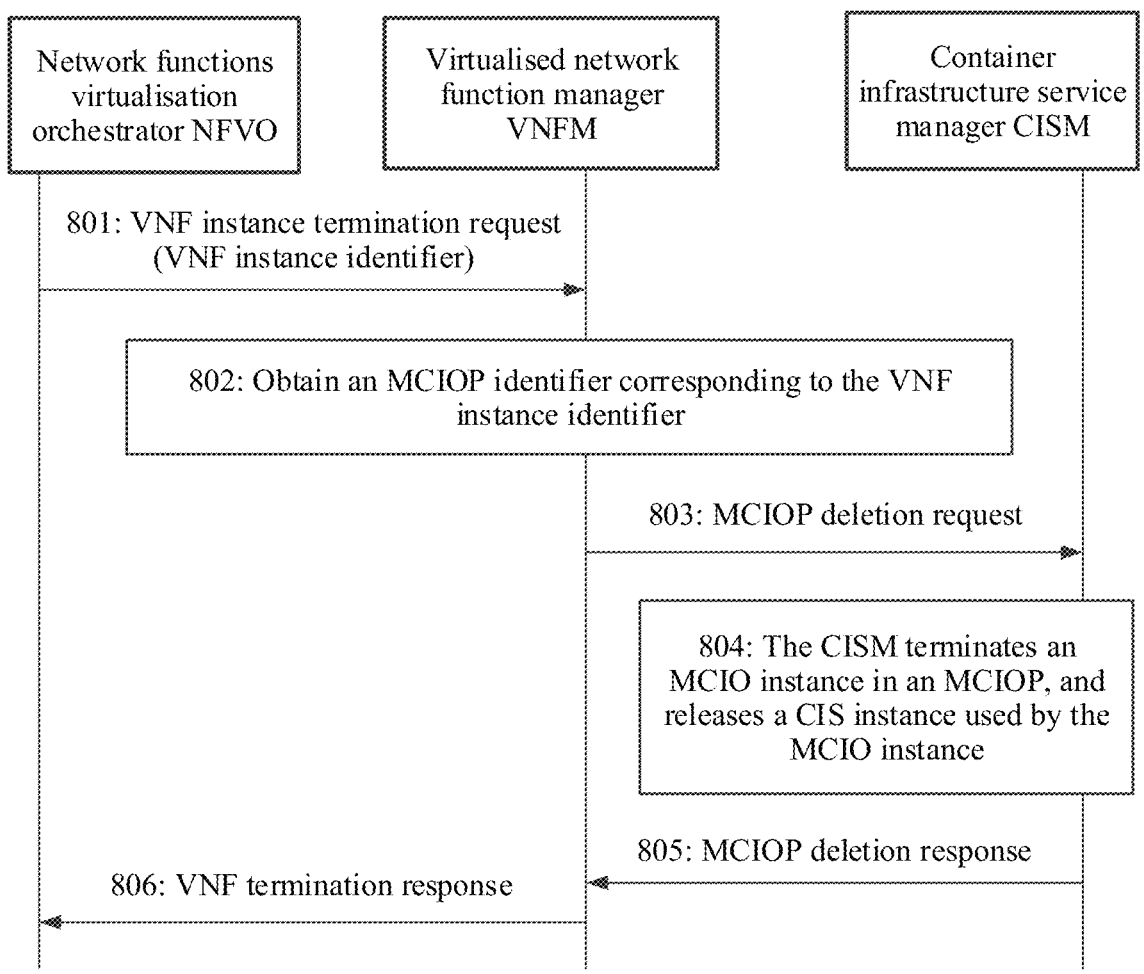
FIG. 8 is a schematic flowchart of a containerized VNF instance termination method according to an embodiment of this application.

FIG. 8 is a schematic flowchart of a containerized VNF instance termination method according to an embodiment of this application. The method may include the following steps.

801: An NFVO sends a VNF instance termination request to a VNFM, where the VNF instance termination request carries a VNF instance identifier of a to-be-terminated VNF instance.

802: The VNFM receives the VNF instance termination request from the NFVO, and obtains, based on a locally maintained mapping relationship between the VNF instance identifier and an MCIOP identifier, an MCIOP corresponding to the to-be-terminated VNF instance.

803: The VNFM sends an MCIOP deletion request to a CISM, where the MCIOP deletion request carries the MCIOP identifier.

804: The CISM receives the MCIOP deletion request from the VNFM, terminates an MCIO instance in an MCIOP, and releases a CIS instance used by the MCIO instance (specifically, for example, releasing and returning a node resource used by a pod object to a node resource pool in Kubernetes).

805: The CISM sends, to the VNFM, an MCIOP deletion response in response to the MCIOP deletion request.

806: The VNFM receives the MCIOP deletion response from the CISM, and the VNFM may further terminate the VNF instance, and release the mapping relationship between the VNF instance identifier and the MCIOP identifier. Further, the VNFM sends, to the NFVO, a VNF instance termination response in response to the VNF instance termination request, where the VNF instance termination response is used to notify that the VNF instance termination process ends.

It can be learned that the foregoing procedure provides a convenient VNF instance termination mechanism, so that termination of a VNF instance is simple and easy to operate.

Figure 9:
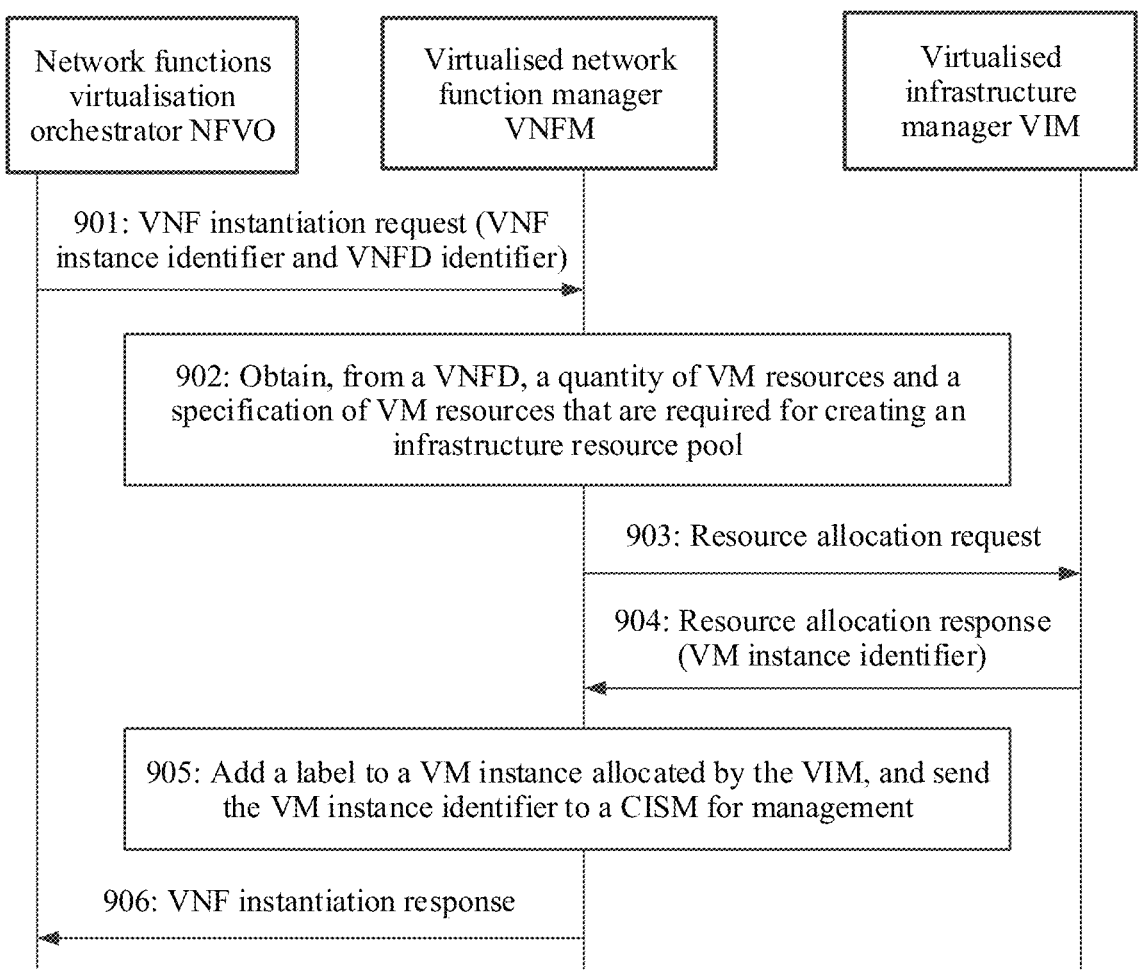
FIG. 9 is a schematic flowchart of a resource pool creation method according to an embodiment of this application.

FIG. 9 is a schematic flowchart of a method for creating an infrastructure resource pool deployed for a containerized VNF according to an embodiment of this application. The method may include the following steps.

901: An NFVO initiates a VNF instantiation request to a VNFM, where the VNF instantiation request carries a VNF instance identifier and a VNFD identifier.

902: The VNFM receives the VNF instantiation request from the NFVO, accesses a VNFD identified by the VNFD identifier, and obtains, from the VNFD, a quantity of VM resources and a specification of VM resources that are required for creating the infrastructure resource pool.

903: The VNFM sends a resource allocation request to a VIM, where the resource allocation request carries the specification of VM resources and the quantity of VM resources of the to-be-created infrastructure resource pool.

904: The VIM receives the resource allocation request from the VNFM, and sends, to the VNFM, a resource allocation response in response to the resource allocation request, where the resource allocation response carries a VM instance identifier of an allocated VM instance.

905: The VNFM receives the resource allocation response from the VIM, adds a label to the VM instance allocated by the VIM, where the label is used to indicate that the VM instance is used as a virtual resource for creating a CIS instance in the infrastructure resource pool (for example, a node resource pool corresponding to Kubernetes), and sends the identifier of the VM instance to a CISM for management (agency management).

906: The VNFM sends, to the NFVO, a VNF instantiation response message in response to the VNF instantiation request, where the VNF instantiation response may be used to notify that the infrastructure resource pool creation process ends.

To reduce complexity of managing the infrastructure resource pool deployed for the containerized VNF, and improve efficiency and reliability of managing the infrastructure resource pool, a capability of an NFV MANO system for managing VM resources is reused and extended in this embodiment, to create the infrastructure resource pool required for deploying the containerized VNF. In this embodiment, the VM resource pool required for deploying the containerized VNF is considered as a special VNF, and the infrastructure resource pool deployed for the containerized VNF is created by executing a VNF instantiation process. After the infrastructure resource pool is successfully created, the VNF instantiation process in the example shown in FIG. 7 may be further executed.

The following further provides some device embodiments.

Figure 10:
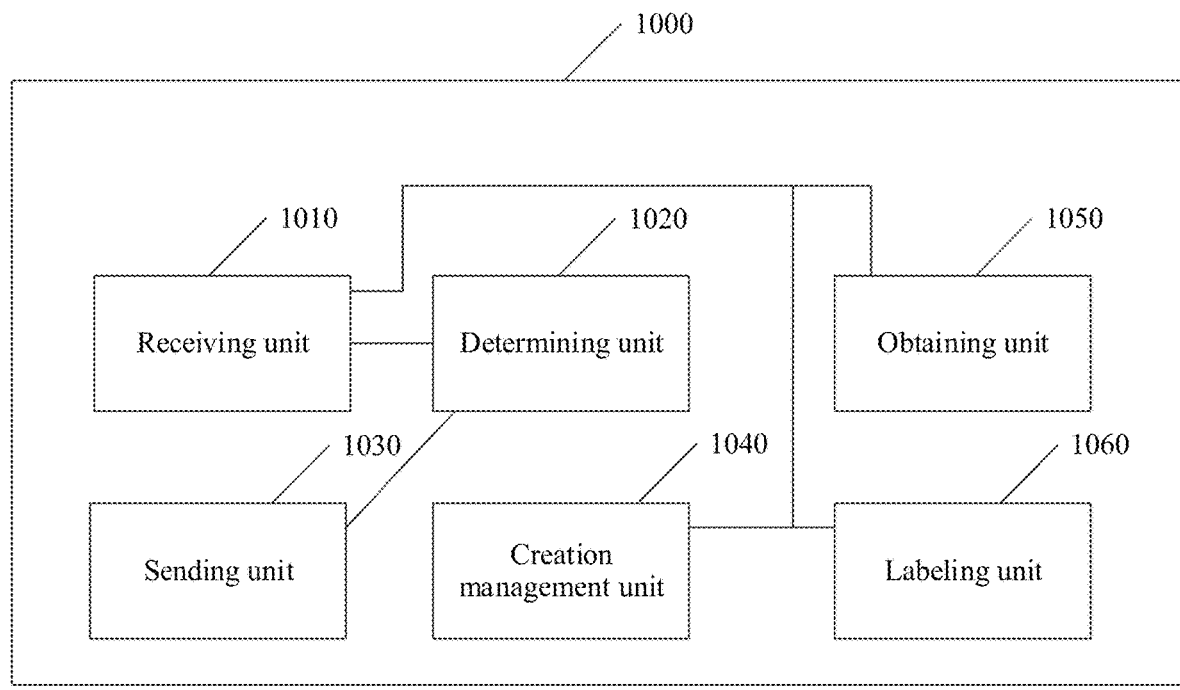
FIG. 10 is a schematic structural diagram of a VNFM architecture according to an embodiment of this application.

Refer to FIG. 10. An embodiment of this application further provides a VNFM 1000, including:
- a receiving unit 1010, configured to receive a first virtualised network function VNF instantiation request from an NFVO, where the first VNF instantiation request carries a first VNF instance identifier and a first virtualised network function descriptor VNFD identifier;
- a determining unit 1020, configured to determine a container object package identifier referenced by a VNFD identified by the first VNFD identifier;
- a sending unit 1030, configured to send a container object package management request to a container management entity, where the container object package management request carries the container object package identifier, where
- the receiving unit 1010 is further configured to receive a container object package management response from the container management entity, where the container object package management response is used to indicate that a container object instance in a container object package identified by the container object package identifier is successfully created; and
- a creation management unit 1040, configured to create a VNF instance identified by the first VNF instance identifier, and maintain a mapping relationship between the first VNF instance identifier and the container object package identifier.

The container object package management request is used to trigger the container management entity to create, based on the container object package identifier, the container object instance in the container object package identified by the container object package identifier. Specifically, for example, the container management entity is triggered to determine a container object package file referenced by the container object package identified by the container object package identifier, create the container object instance in the container object package based on the container object package file, and schedule the created container object instance to a container runtime instance used by the created container object instance.

In some possible implementations, the sending unit 1030 is further configured to: before sending the container object package management request to the container management entity, send a container object package creation request to the container management entity, where the container object package creation request carries a name and/or an access address of the container object package file used for creating the container object package.

The receiving unit 1010 is further configured to receive a container object package creation response from the container management entity, where the container object package creation response carries the container object package identifier of the container object package created by the container management entity.

In some possible implementations, the receiving unit 1010 is further configured to receive a VNF instance termination request from the NFVO, where the VNF instance termination request carries a second VNF instance identifier.

The determining unit 1020 is further configured to determine a container object package identifier that has a mapping relationship with the second VNF instance identifier.

The sending unit 1030 is further configured to send a container object package deletion request to the container management entity, where the container object package deletion request carries the determined container object package identifier. The container object package deletion request is used to trigger the container management entity to terminate a container object instance in a container object package identified by the container object package identifier, and release a container runtime instance used by the terminated container object instance.

In some possible implementations, the receiving unit 1010 is further configured to receive a second VNF instantiation request from the NFVO, where the second VNF instantiation request carries the second VNF instance identifier and a second VNFD identifier.

The VNFM further includes an obtaining unit 1050, configured to obtain, from a VNFD identified by the second VNFD identifier, a quantity of VM resources and a specification of VM resources that are required by a to-be-created infrastructure resource pool.

The sending unit 1030 is further configured to send a resource allocation request to a virtualised infrastructure manager VIM, where the resource allocation request carries the specification of VM resources and the quantity of VM resources that are of the to-be-created infrastructure resource pool.

The receiving unit 1010 is further configured to receive a resource allocation response from the VIM, where the resource allocation response carries a VM instance identifier of an allocated VM instance.

The VNFM further includes a labeling unit 1060, configured to add a label to the VM instance, where the label is used to indicate that the VM instance is used as a virtual resource for creating a container runtime instance in the infrastructure resource pool.

The sending unit 1030 is further configured to send the VM instance identifier to the container management entity for management.

In some possible implementations, the container object package file is mapped as a Helm Chart, and the container object package instance is mapped as a Helm Release.

In some possible implementations, the VNFD further includes a virtualisation deployment unit VDU identifier. When the VNF is a VM-based VNF, a VDU attribute included in the VNFD is allowed to be used, and a container object package attribute referenced by the VNFD is forbidden to be used. When the VNF is a containerized VNF, a VDU attribute included in the VNFD is allowed to be used or forbidden to be used, and a container object package attribute referenced by the VNFD is allowed to be used.

In some possible implementations, the container object package includes one or more container objects, and each container object is mapped as an object in an open-source de facto standard.

In some possible implementations, the container object is mapped as a Kubernetes object, the Kubernetes object includes a pod, a service, or a deployment, and the container object is visible to the container management entity and invisible to a management and orchestration entity.

For functions of the functional modules of the VNFM 1000, refer to the methods shown in FIG. 6 to FIG. 9 for specific implementation. For example, the receiving unit 1010 may execute the actions executed by the VNFM in steps 902 and 905. The sending unit 1030 may execute the actions executed by the VNFM in steps 903 and 906. The creation management unit 1040 may execute the actions executed by the VNFM in step 606. Functions of other function units are deduced by analogy.

Figure 11:
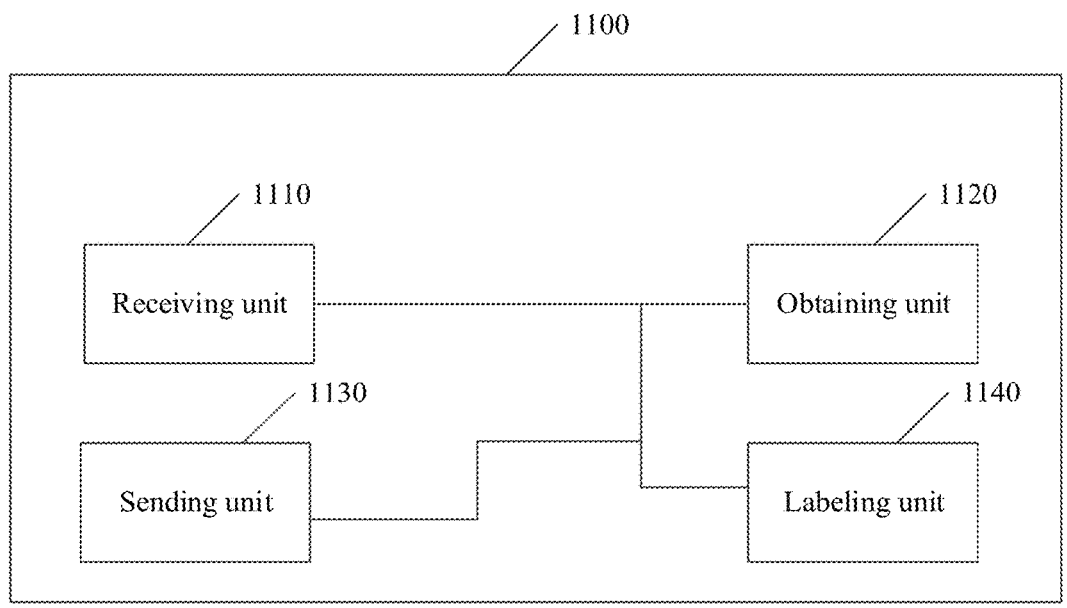
FIG. 11 is a schematic structural diagram of another VNFM architecture according to an embodiment of this application.

Refer to FIG. 11. An embodiment of this application further provides another VNFM 1100, including:
- a receiving unit 1110, configured to receive a second virtualised network function VNF instantiation request from an NFVO, where the second VNF instantiation request carries a second VNF instance identifier and a second virtualised network function descriptor VNFD identifier;
- an obtaining unit 1120, configured to obtain, from a VNFD identified by the second VNFD identifier, a quantity of VM resources and a specification of VM resources that are required by a to-be-created infrastructure resource pool;
- a sending unit 1130, configured to send a resource allocation request to a virtualised infrastructure manager VIM, where the resource allocation request carries the specification of VM resources and the quantity of VM resources that are of the to-be-created infrastructure resource pool, where
- the receiving unit 1110 is further configured to receive a resource allocation response from the VIM, where the resource allocation response carries a VM instance identifier of an allocated VM instance; and
- a labeling unit 1140, configured to add a label to the VM instance, where the label is used to indicate that the VM instance is used as a virtual resource for creating a container runtime instance in the infrastructure resource pool, where
- the sending unit 1130 is further configured to send the VM instance identifier to a container management entity for management.

For functions of the functional modules of the VNFM 1100, refer to the method shown in FIG. 9 for specific implementation. For example, the receiving unit 1110 may execute actions executed by the VNFM in steps 902 and 905. The sending unit 1130 may execute actions executed by the VNFM in steps 903 and 906. Functions of other function units are deduced by analogy.

Figure 12:
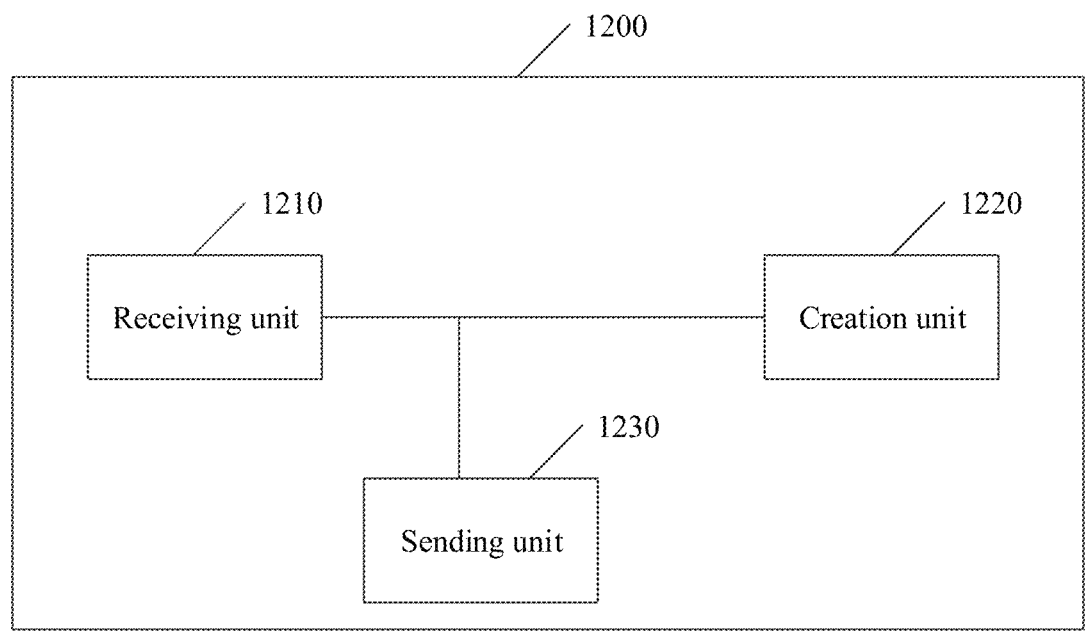
FIG. 12 is a schematic architectural diagram of a container management entity according to an embodiment of this application.

Refer to FIG. 12. An embodiment of this application further provides a container management entity 1200, including:
- a receiving unit 1210, configured to receive a container object package management request from a virtualised network function manager VNFM, where the container object package management request carries a container object package identifier referenced by a virtualised network function descriptor VNFD;
- a creation unit 1220, configured to create, for the container management entity based on the container object package identifier, a container object instance in a container object package identified by the container object package identifier; and
- a sending unit 1230, configured to send a container object package management response to the VNFM, where the container object package management response is used to indicate that the container object instance in the container object package identified by the container object package identifier is successfully created.

For example, the creating, based on the container object package identifier, a container object instance in a container object package identified by the container object package identifier may include: determining a container object package file referenced by the container object package identified by the container object package identifier, creating the container object instance in the container object package based on the container object package file, and scheduling the created container object instance to a container runtime instance used by the container object instance.

For functions of the functional modules of the container management entity 1200, refer to the methods shown in FIG. 6 to FIG. 9 for specific implementation. The functional modules may cooperatively execute some or all actions executed by the container management entity (such as a CISM).

Figure 13:
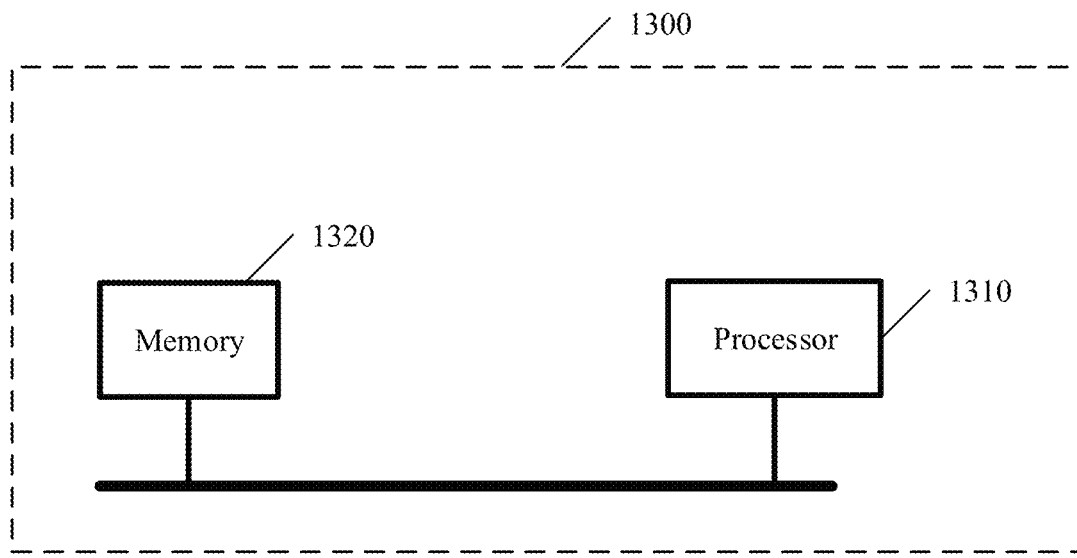
FIG. 13 is a schematic architectural diagram of a communications device according to an embodiment of this application.

Refer to FIG. 13. An embodiment of this application further provides a general-purpose communications device 1300. The communications device 1300 may implement functions of the VNFM, the NFVO, or the container management entity provided in the foregoing embodiments. The communications device 1300 specifically includes:
- a processor 1310 and a memory 1320 that are coupled to each other.

The processor 1310 is configured to invoke a computer program stored in the memory 1320, to complete some or all of the steps of any method performed by the VNFM in the embodiments of this application.

In addition, the processor 1310 may invoke different computer programs stored in the memory 1320, to complete some or all of the steps of any method performed by the NFVO or the container management entity in the embodiments of this application.

The processor 1310 is also referred to as a central processing unit (CPU, Central Processing Unit). In specific application, components of the communications device are coupled together, for example, by using a bus system. In addition to a data bus, the bus system may further include a power bus, a control bus, a status signal bus, and the like. The methods disclosed in the embodiments of this application may be applied to the processor 1310, or may be implemented by the processor 1310. The processor 1310 may be an integrated circuit chip, and has a signal processing capability. In some implementation processes, some or all of the steps in the foregoing methods can be implemented by using an integrated logical circuit of hardware in the processor 1310, or by using instructions in a form of software. The processor 1310 may be a general-purpose processor, a digital signal processor, an application-specific integrated circuit, a field programmable gate array or another programmable logic device, a discrete gate or a transistor logic device, or a discrete hardware component. The processor 1310 may implement or perform methods, steps, and logical block diagrams disclosed in the embodiments of this application. The general-purpose processor 1310 may be a microprocessor, or the processor may be any conventional processor, or the like. Steps of the methods disclosed in the embodiments of this application may be directly performed and completed by a hardware decoding processor, or may be performed and completed by using a combination of hardware in the decoding processor and a software module. A software module may be located in a mature storage medium in the art, such as a random access memory, a flash memory, a read-only memory, a programmable read-only memory, an electrically erasable programmable memory, or a register. The storage medium is located in the memory 1320. For example, the processor 1310 may read information from the memory 1320, and complete some or all of the steps in the foregoing methods in combination with hardware of the processor 1310.

An embodiment of this application further provides a computer-readable storage medium. The computer-readable storage medium stores a computer program, and the computer program is executed by hardware (for example, a processor), to perform some or all of the steps of any method performed by any device in the embodiments of this application.

An embodiment of this application further provides a computer program product including instructions. When the computer program product runs on a computer device, the computer device is enabled to perform some or all of the steps of any method in the foregoing embodiments.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line) or wireless (for example, infrared, radio, or microwave) manner. The computer-readable storage medium may be any usable medium accessible to the computer, or a data storage device, such as a server or a data center, integrating one or more usable media. The usable medium may be a magnetic medium (for example, a floppy disk, a hard disk, or a magnetic tape), an optical medium (for example, an optical disc), a semiconductor medium (for example, a solid state disk), or the like. In the foregoing embodiments, the descriptions in the embodiments have respective focuses. For a part that is not described in detail in an embodiment, refer to related descriptions in other embodiments.

In the foregoing embodiments, the descriptions in the embodiments have respective focuses. For a part that is not described in detail in an embodiment, refer to related descriptions in other embodiments.

In the several embodiments provided in this application, it should be understood that the disclosed apparatus may be implemented in other manners. For example, the described apparatus embodiment is merely an example. For example, the unit division is merely logical function division or may be other division in actual implementation. For example, a plurality of units or components may be combined or integrated into another system, or some features may be ignored or not performed. In addition, the displayed or discussed mutual indirect couplings or direct couplings or communication connections may be implemented through some interfaces. The indirect couplings or communication connections between the apparatuses or units may be implemented in electronic or other forms.

The units described as separate parts may or may not be physically separate. Parts displayed as units may or may not be physical units, and may be located in one position or may be distributed on a plurality of network units. Some or all of the units may be selected based on actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM, Read-Only Memory), a random access memory (RAM, Random Access Memory), a magnetic disk, and an optical disc.

What is claimed is:

1. A containerized virtualised network function (VNF) deployment method, comprising:
    receiving, by a virtualised network function manager (VNFM), a first VNF instantiation request from a network functions virtualisation orchestrator (NFVO), wherein the first VNF instantiation request carries a first virtualised network function descriptor (VNFD) identifier;
    determining, by the VNFM based on a VNFD identified by the first VNFD identifier, a container object package identifier referenced by a to-be-instantiated VNF;
    sending, by the VNFM, a container object package management request to a container management entity, wherein the container object package management request carries the container object package identifier;

receiving, by the VNFM, a container object management response from the container management entity, wherein the container object management response is used to indicate that a container object instance corresponding to a container object package identified by the container object package identifier is successfully created;

completing, by the VNFM, a VNF instantiation process based on the container object instance; and maintaining a mapping relationship between an identifier of a VNF instance obtained through VNF instantiation and the container object package identifier;

wherein before the receiving the first VNF instantiation request from the NFVO, the method further comprises:

receiving, by the VNFM, a second VNF instantiation request from the NFVO, wherein the second VNF instantiation request carries a second VNF instance identifier and a second VNFD identifier;

obtaining, by the VNFM, from a VNFD identified by the second VNFD identifier, a quantity of virtual machine (VM) resources and a specification of VM resources that are required by a to-be-created infrastructure resource pool;

sending, by the VNFM, a resource allocation request to a virtualised infrastructure manager (VIM), wherein the resource allocation request carries the specification of VM resources and the quantity of VM resources that are of the to-be-created infrastructure resource pool;

receiving, by the VNFM, a resource allocation response from the VIM, wherein the resource allocation response carries a VM instance identifier of an allocated VM instance;

adding, by the VNFM, a label to the VM instance, wherein the label is used to indicate that the VM instance is used as a virtual resource for creating a container runtime instance in the infrastructure resource pool, wherein the container object instance is to be scheduled to the container runtime instance;

sending, by the VNFM, the VM instance identifier to the container management entity for management.

2. The method according to claim 1, wherein the management request is used to trigger the container management entity to determine a container object package file referenced by the container object package identified by the container object package identifier, create the container object instance based on the container object package file, and schedule the created container object instance to a container runtime instance used by the container object instance.

3. The method according to claim 2, wherein the container object package file is mapped as a Helm Chart.

4. The method according to claim 2, wherein the container object package comprises one or more container objects, and each container object is mapped as an object in an open-source de facto standard.

5. The method according to claim 4, wherein the container object is mapped as a Kubernetes object, the Kubernetes object comprises a pod, a service, or a deployment, and the container object is visible to the container management entity.

6. A containerized virtualised network function (VNF) deployment method, comprising:

receiving, by a virtualised network function manager (VNFM), a first VNF instantiation request from a network functions virtualisation orchestrator (NFVO), wherein the first VNF instantiation request carries a first virtualised network function descriptor (VNFD) identifier;

determining, by the VNFM based on a VNFD identified by the first VNFD identifier, a container object package identifier referenced by a to-be-instantiated VNF;

sending, by the VNFM, a container object package management request to a container management entity, wherein the management request carries the container object package identifier;

after receiving the management request, creating, by the container management entity, a corresponding container object instance based on a container object package identified by the container object package identifier, and sending a container object package management response to the VNFM, wherein the management response is used to indicate that the container object instance corresponding to the container object package identified by the container object package identifier is successfully created;

receiving, by the VNFM, the container object package management response from the container management entity;

completing, by the VNFM, a VNF instantiation process based on the container object instance; and maintaining a mapping relationship between an identifier of a VNF instance obtained through VNF instantiation and the container object package identifier;

wherein before the receiving the first VNF instantiation request from the NFVO, the method further comprises:

receiving, by the VNFM, a second VNF instantiation request from the NFVO, wherein the second VNF instantiation request carries the second VNF instance identifier and a second VNFD identifier;

obtaining, by the VNFM, from a VNFD identified by the second VNFD identifier, a quantity of virtual machine (VM) resources and a specification of VM resources that are required by a to-be-created infrastructure resource pool;

sending, by the VNFM, a resource allocation request to a virtualised infrastructure manager (VIM), wherein the resource allocation request carries the specification of VM resources and the quantity of VM resources that are of the to-be-created infrastructure resource pool;

receiving, by the VNFM, a resource allocation response from the VIM, wherein the resource allocation response carries a VM instance identifier of an allocated VM instance;

adding, by the VNFM, a label to the VM instance, wherein the label is used to indicate that the VM instance is used as a virtual resource for creating a container runtime instance in the infrastructure resource pool, wherein the container object instance is to be scheduled to the container runtime instance;

sending, by the VNFM, the VM instance identifier to the container management entity for management.

7. The method according to claim 6, further comprising:

after receiving the management request, determining, by the container management entity, a container object package file referenced by the container object package identified by the container object package identifier, and wherein the creating, by the container management entity, a corresponding container object instance comprises:

creating, by the container management entity, the corresponding container object instance based on the container object package file; and scheduling, by the container management entity, the created container object instance to a container runtime instance used by the container object instance.

8. The method according to claim 7, wherein the container object package file is mapped as a Helm Chart.

9. The method according to claim 7, wherein the container object package comprises one or more container objects, and each container object is mapped as an object in an open-source de facto standard.

10. The method according to claim 9, wherein the container object is mapped as a Kubernetes object, the Kubernetes object comprises a pod, a service, or a deployment, and the container object is visible to the container management entity.

11. A virtualised network function manager (VNFM), comprising:
a memory; and
a processor coupled to the memory, wherein the processor is configured to execute computer programming instructions stored in the memory to cause the VNFM to:
receive a first virtualised network function (VNF) instantiation request from a network functions virtualisation orchestrator (NFVO), wherein the first VNF instantiation request carries a first virtualised network function descriptor (VNFD) VNFD identifier;
determine, based on a VNFD identified by the first VNFD identifier, a container object package identifier referenced by a to-be-instantiated VNF;
send a container object package management request to a container management entity, wherein the management request carries the container object package identifier;
receive a container object package management response from the container management entity, wherein the management response is used to indicate that a container object instance corresponding to a container object package identified by the container object package identifier is successfully created;
complete a VNF instantiation process based on the container object instance; and
maintain a mapping relationship between an identifier of a VNF instance obtained through VNF instantiation and the container object package identifier;
wherein before the receiving the first VNF instantiation request from the NFVO, the processor in the VNFM is further configured to execute computer programming instructions stored in the memory to cause the VNFM to:
receive a second VNF instantiation request from the NFVO, wherein the second VNF instantiation request carries the second VNF instance identifier and a second VNFD identifier;
obtain from a VNFD identified by the second VNFD identifier, a quantity of virtual machine (VM) resources and a specification of VM resources that are required by a to-be-created infrastructure resource pool;
send a resource allocation request to a virtualised infrastructure manager (VIM), wherein the resource allocation request carries the specification of VM resources and the quantity of VM resources that are of the to-be-created infrastructure resource pool;
receive a resource allocation response from the VIM, wherein the resource allocation response carries a VM instance identifier of an allocated VM instance;
add a label to the VM instance, wherein the label is used to indicate that the VM instance is used as a virtual resource for creating a container runtime instance in the infrastructure resource pool, wherein the container object instance is to be scheduled to the container runtime instance;
send the VM instance identifier to the container management entity for management.

12. The VNFM according to claim 11, wherein the management request is used to trigger the container management entity to determine a container object package file referenced by the container object package identified by the container object package identifier, create the container object instance based on the container object package file, and schedule the created container object instance to a container runtime instance used by the container object instance.

13. The VNFM according to claim 12, wherein the container object package file is mapped as a Helm Chart.

14. The VNFM according to claim 12, wherein the container object package comprises one or more container objects, and each container object is mapped as an object in an open-source de facto standard.

15. The VNFM according to claim 14, wherein the container object is mapped as a Kubernetes object, the Kubernetes object comprises a pod, a service, or a deployment, and the container object is visible to the container management entity.

16. A communications system, comprising:
a virtualised network function manager (VNFM); and
a container management entity,
wherein the VNFM comprises a processor and a memory coupled to the processor, wherein the processor is configured to execute computer programming instructions stored in the memory to cause the VNFM to:
receive a first virtualised network function (VNF) instantiation request from a network functions virtualisation orchestrator (NFVO), wherein the first VNF instantiation request carries a first virtualised network function descriptor (VNFD) identifier;
determine, based on a VNFD identified by the first VNFD identifier, a container object package identifier referenced by a to-be-instantiated VNF;
send a container object package management request to a container management entity, wherein the management request carries the container object package identifier,
wherein the container management entity comprises a processor and a memory coupled to the processor, wherein the processor is configured to execute computer programming instructions stored in the memory to cause the container management entity to:
after receiving the management request, create a corresponding container object instance based on a container object package identified by the container object package identifier, and send a management response to the VNFM, wherein the management response is used to indicate that the container object instance corresponding to the container object package identified by the container object package identifier is successfully created, and
wherein the processor of the VNFM is further configured to execute the computer programming instructions to cause the VNFM to:
receive the container object package management response from the container management entity;

complete a VNF instantiation process based on the container object instance; and maintain a mapping relationship between an identifier of a VNF instance obtained through VNF instantiation and the container object package identifier;

wherein before the receiving the first VNF instantiation request from the NFVO, the processor in the VNFM is further configured to execute computer programming instructions stored in the memory to cause the VNFM to:

receive a second VNF instantiation request from the NFVO, wherein the second VNF instantiation request carries the second VNF instance identifier and a second VNFD identifier;

obtain from a VNFD identified by the second VNFD identifier, a quantity of virtual machine (VM) resources and a specification of VM resources that are required by a to-be-created infrastructure resource pool;

send a resource allocation request to a virtualised infrastructure manager (VIM), wherein the resource allocation request carries the specification of VM resources and the quantity of VM resources that are of the to-be-created infrastructure resource pool;

receive a resource allocation response from the VIM, wherein the resource allocation response carries a VM instance identifier of an allocated VM instance;

add a label to the VM instance, wherein the label is used to indicate that the VM instance is used as a virtual resource for creating a container runtime instance in the infrastructure resource pool, wherein the container object instance is to be scheduled to the container runtime instance;

send the VM instance identifier to the container management entity for management.

17. The system according to claim 16, wherein the processor of the container management entity is further configured to execute the computer programming instructions to cause the container management entity to:

after receiving the management request, determine a container object package file referenced by the container object package identified by the container object package identifier;

create the corresponding container object instance based on the container object package file; and schedule the created container object instance to a container runtime instance used by the container object instance.

18. The system according to claim 17, wherein the container object package file is mapped as a Helm Chart.

19. The system according to claim 16, wherein the container object package comprises one or more container objects, and each container object is mapped as an object in an open-source de facto standard.

20. The system according to claim 19, wherein the container object is mapped as a Kubernetes object, the Kubernetes object comprises a pod, a service, or a deployment, and the container object is visible to the container management entity.

* * * * *